(12) United States Patent
Yoshida

(10) Patent No.: US 7,232,182 B2
(45) Date of Patent: Jun. 19, 2007

(54) CHILD SEAT

(75) Inventor: Ryoichi Yoshida, Shiga (JP)

(73) Assignee: Takata Corporation, Tokyo (JP)

( * ) Notice: Subject to any disclaimer, the term of this patent is extended or adjusted under 35 U.S.C. 154(b) by 278 days.

(21) Appl. No.: 10/742,912

(22) Filed: Dec. 23, 2003

(65) Prior Publication Data

US 2004/0164529 A1 Aug. 26, 2004

(30) Foreign Application Priority Data

| Feb. 25, 2003 | (JP) | ............................. | 2003-047741 |
| Feb. 25, 2003 | (JP) | ............................. | 2003-047742 |
| Apr. 16, 2003 | (JP) | ............................. | 2003-111773 |
| Apr. 16, 2003 | (JP) | ............................. | 2003-111774 |
| Apr. 16, 2003 | (JP) | ............................. | 2003-111775 |
| Apr. 16, 2003 | (JP) | ............................. | 2003-111776 |
| Apr. 16, 2003 | (JP) | ............................. | 2003-111777 |
| Apr. 16, 2003 | (JP) | ............................. | 2003-111778 |

(51) Int. Cl.
*B60N 2/42* (2006.01)

(52) U.S. Cl. ................................. 297/216.11

(58) Field of Classification Search ........... 297/216.11, 297/250.1, 452.41
See application file for complete search history.

(56) References Cited

U.S. PATENT DOCUMENTS 4,643,474 A 2/1987 Wise et al.
4,834,420 A * 5/1989 Sankrithi et al. ........ 280/728.1
5,720,519 A * 2/1998 Barnes ........................ 280/737
5,779,304 A * 7/1998 Cunningham .......... 297/216.11

FOREIGN PATENT DOCUMENTS

| DE | 44 46 595 A1 | 10/1995 |
| DE | 296 06 523 U1 | 6/1996 |
| DE | 195 45 263 A1 | 5/1997 |
| DE | 197 05 500 A1 | 8/1998 |
| DE | 198 00 078 A1 | 7/1999 |
| DE | 199 32 801 A1 | 1/2001 |
| EP | 0931694 A2 | 7/1999 |
| GB | 2 323 571 A | 9/1998 |
| JP | 61-235251 | 10/1986 |
| JP | 64-37743 | 3/1989 |
| JP | 1-61165 | 4/1989 |
| JP | 10-157553 | 6/1998 |
| JP | 10157553 | 6/1998 |
| JP | 11011192 | 1/1999 |
| JP | 2000289504 | 10/2000 |
| JP | 2001-341611 | 12/2001 |
| JP | 2001341611 | 12/2001 |

\* cited by examiner

*Primary Examiner*—Milton Nelson, Jr.
(74) *Attorney, Agent, or Firm*—Manabu Kanesaka

(57) ABSTRACT

A child seat includes a seat body having a seat portion, a backrest, and left and right side guards, an airbag provided adjacent to the seat body for receiving the child upon inflation thereof, and an inflating device communicating with the airbag for inflating the airbag. When the inflating device is actuated, the airbag is inflated to receive the child for protection.

29 Claims, 18 Drawing Sheets

CHILD SEAT

BACKGROUND OF THE INVENTION AND RELATED ART STATEMENT

The present invention relates to a child seat used in an automobile and the like. In particular, the present invention relates to a child seat with an airbag to be inflated for receiving a head portion of a child.

A common child seat installed in an automobile has a seat body for accommodating a child and a seatbelt for supporting the child. A child seat may be provided with an impact shield disposed in front of an abdomen of a child (Japanese Patent Publication (Kokai) No. 61-235251). The seat body includes a seat portion for placing a buttock of the child, a backrest for placing a back of the child, and left and right side guards located on left and right sides of the child.

Japanese Patent Publication (Kokai) No. 2001-341611 has disclosed a child seat in which two arms extend upwardly from left and right sides of a seat body towards a front of the child seat and an airbag module is disposed between ends of the arms. The airbag module includes a cylindrical diffuser housing with a build-in inflator (gas generator) and an airbag disposed around a circumference of the diffuser housing. A collision sensor is provided on the seat body. When the collision sensor sends a signal upon a collision, the inflator is activated to generate gas. The gas inflates the airbag widely in front of the child sitting in the child seat.

Japanese Patent Publication (Kokai) No. 10-157553 has disclosed a child seat in which when a high-load is applied due to an automobile collision, an airbag is inflated along outer surfaces of left and the right side guards (side support portions) for protecting a child.

Japanese Utility Model Publication (Kokai) No. 64-37743 has disclosed a child seat in which a concave headrest is disposed around a head portion of a child from a backside to left and the right sides.

In the airbag module disclosed in Japanese Patent Publication (Kokai) No. 2001-341611, the inflator has a heavy weight, thereby increasing a weight of the child seat. Moreover, it is necessary to provide an activation mechanism for the inflator, thereby increasing a cost of the child seat.

In the child seat disclosed in Japanese Patent Publication (Kokai) No. 10-157553, the airbag is inflated along the entire outer surfaces of the side guards. Accordingly, it is necessary to provide a large-capacity inflator. In a case that the airbag is inflated when a person sits closely next to the child seat, the airbag may be inflated between the person and the child seat, thereby applying an unexpected external force to the person.

In the child seat disclosed in Japanese Utility Model Publication No. 64-37743, the headrest is situated around the head portion of the child at all the time, thereby causing discomfort to the child.

In view of the problems described above, an object of the present invention is to provide a child seat with a simple and lightweight structure for sufficiently protecting a child.

Further objects and advantages of the invention will be apparent from the following description of the invention.

SUMMARY OF THE INVENTION

According to the first embodiment of the present invention, a child seat includes a seat body comprising a seat portion, a backrest, and a left side guard and a right side guard; an airbag disposed on the seat body to be inflated at a side of a head portion of a child sitting in the child seat; and a cushion disposed along a side surface of the child seat at an outside of the side guards. The cushion is formed in a hollow body. An inside of the cushion communicates with an inside of the airbag via a communicating portion. The communicating portion is provided with reverse-flow prevention means for allowing gas to flow into the airbag from the cushion while preventing the gas from flowing in the opposite direction.

In the child seat, the cushion is disposed along the side surface of the child seat at the outside of the side guard for absorbing an impact caused by a high-load from a side upon a side collision. The gas inside the cushion moves to the airbag via the communicating portion, and the airbag is inflated at a side of the head portion of the child. Further, the communicating portion between the cushion and the airbag is provided with the reverse-flow prevention means for allowing the gas to flow into the airbag from the cushion while preventing the gas from flowing in the opposite direction. Accordingly, it is possible to prevent the gas from escaping into the cushion from the airbag when the airbag receives the head portion of the child.

In the first embodiment of the present invention, it is not necessary to provide supplying means such as an inflator for inflating the airbag. Therefore, it is possible to make a structure of the child seat extremely simple and light.

According to the first embodiment of the present invention, the child seat may comprise a seat body with a seat portion, a backrest, and left and right side guards; an airbag disposed on the seat body to be inflated around a side of a child; and a cushion disposed along a side of the child seat at an outside of the side guard. The cushion is a gasbag filled with gas. The gasbag has gas outlet means for ejecting the gas from the gasbag when a gas pressure inside the gasbag exceeds a predetermined value, and a communicating portion for introducing the gas from the gasbag into the airbag. The communicating portion has reverse-flow prevention means for allowing the gas to flow out from the gasbag into the airbag while preventing the gas from flowing in the opposite direction.

In the child seat, the cushion is disposed along the side surface of the child seat at the outside of the side guard for absorbing an impact caused by a high-load from a side upon a side collision. When the gas pressure in the gasbag exceeds a predetermined value due to the load applied from the side of the child seat, the gas inside the gasbag flows into the airbag via the communicating portion. Accordingly, the airbag is inflated around the side of the child to receive the head portion of the child. It is possible to make the structure of the gasbag extremely simple and light compared to a structure with an inflator.

In the child seat, the communicating portion has the reverse-flow prevention means for allowing the gas to flow into the airbag from the gasbag while preventing the gas from flowing in the opposite direction. Therefore, the gas is prevented from escaping into the gasbag from the airbag when the airbag receives the child's head. The gas outlet means may include a film for partitioning the gasbag and the airbag. The film breaks when the gas pressure inside the gasbag exceeds a predetermined value. The gas is filled in the gasbag at a pressure higher than atmospheric pressure, so that the airbag is inflated quickly. Even when the airbag has a large volume, it is possible to inflate the airbag to a sufficiently large size. The airbag may have a small size as long as the airbag is inflated around the side of the child.

Accordingly, it is possible to inflate the airbag quickly without increasing a size of the cushion or the gasbag for inflating the airbag and increasing the gas pressure of the gas filled in the gasbag.

According to the first embodiment of the present invention, the child seat may comprise a seat body; a load-bearing body disposed in front of the child sitting in the seat body; an airbag provided on the load-bearing member; and airbag inflating means. The airbag inflating means is a hollow cushion disposed on a rear surface of the load-bearing member. An inside of the cushion communicates with the airbag via a communicating portion. The communicating portion has reverse-flow prevention means for allowing the gas to flow from the cushion into the airbag while preventing the gas from flowing in the opposite direction.

In the child seat, in case of an automobile collision, the child's body presses against the cushion, thereby causing the gas in the cushion to flow into the airbag. It is possible to make the cushion simple and lightweight compared to an inflating device using an inflator. The communicating portion has the reverse-flow prevention means for allowing the gas to flow into the airbag from the cushion while preventing the gas from flowing in the opposite direction. Therefore, the gas is prevented from escaping into the cushion from the airbag when the airbag receives the child's body.

According to the first embodiment of the present invention, the child seat may comprise a seat body; a load-bearing member disposed in front of the child sitting in the seat body; an airbag provided on the load-bearing member; and airbag inflating means. The airbag inflating means is a gasbag filled with gas and disposed on the rear surface of the load-bearing member. The gasbag has gas outlet means for allowing the gas flow out of the gasbag when the child's body presses the gasbag and the gas pressure in the gasbag exceeds a predetermined value. The gasbag also has a communicating portion for introducing the gas into the airbag. The communicating portion has reverse-flow prevention means for allowing the gas to flow from the cushion into the airbag while preventing the gas from flowing in the opposite direction.

In the child seat, in case of an automobile collision, the child's body presses the cushion, thereby causing the gas pressure in the gasbag to exceed a predetermined value. Accordingly, the gas inside the gasbag is introduced into the airbag via the communicating portion, so that the airbag is inflated. It is possible to make the cushion simple and light as compared to an inflating device using an inflator. The communicating portion has the reverse-flow prevention means for allowing the gas to flow into the airbag from the cushion while preventing the gas from flowing in the opposite direction. Therefore, the gas is prevented from escaping into the cushion from the airbag when the airbag receives the child's body.

The gas outlet means may include a film for partitioning the gasbag and the airbag. The film breaks when the gas pressure inside the gasbag exceeds a predetermined value. The gas is filled in the gasbag at a pressure higher than atmospheric pressure, so that the airbag is inflated quickly. Even when the airbag has a large volume, it is possible to inflate the airbag to a sufficiently large size. The load-bearing member may include a pad or an impact shield as an example. The airbag may be inflated upwards from the load-bearing member along the child's chest to receive the child's head. The airbag may have a small size as compared to an airbag to be inflated in front of the child's entire body.

Accordingly, it is possible to inflate the airbag quickly without increasing a size of the cushion or the gasbag for inflating the airbag and the gas pressure of the gas filled in the gasbag.

According to the second embodiment of the present invention, a child seat includes a seat body having a seat, a backrest, and left and right side guards; an airbag provided on the seat body to be inflated around a temporal region of a child; and a cushion provided along a side of the child seat at an outside of the side guard and having a hollow space therein. The gas in the hollow space is supplied into the airbag to thereby inflate the airbag. When an automobile with such a child seat has a side collision, a side of a car body pushes the cushion and the gas, (for, example, air) in the hollow space of the cushion is supplied into the airbag to inflate the airbag toward the temporal region of the child, thereby absorbing an impact applied to the head of the child. The cushion is arranged on the side of the child seat at the outside of the side guard to absorb an impact when a high load applied laterally during a side crash.

In the child seat, the cushion may include a plurality of cushions, and the gas is supplied into the airbag from the hollow space of each cushion. Therefore, when only some of the cushions are pushed, the gas in the cushions is supplied into the airbag without escaping into the other cushions, so that the airbag is inflated quickly.

According to the second embodiment of the present invention, at least some of the cushions may be arranged at vertically different positions. In this case, when the side of the car body pushes only the cushions at a lower side during a side crash; the gas is supplied into the airbag from the cushions at the lower side. The child seat is suitable when the child seat is arranged such that the upper cushions face a window of a door and the lower cushions face a door trim.

According to the second embodiment of the present invention, the child seat may include cushions having a plurality of hollow spaces, so that the gas can be supplied into the airbag from each of the hollow spaces. Therefore, when only some of the hollow spaces are pushed, the gas in the hollow spaces is supplied into the airbag without escaping into the other hollow spaces to thereby inflate the airbag quickly. At least some of the hollow spaces may be arranged at vertically different positions. In this case, when the side of the car body pushes only the hollow spaces at a lower side in a side crash, the gas is supplied into the airbag from the hollow spaces at the lower side. The child seat is suitable when the child seat is arranged such that the upper cushions face the window of the door and the lower cushions face the door trim.

According to the second embodiment of the present invention, the child seat may further include non-return means for preventing the gas from flowing from the airbag into the cushion. When the child seat is provided with the non-return means, the gas is supplied from some of the cushions into the airbag to inflate the airbag, and the gas is prevented from flowing back to the other cushions from the airbag, thereby maintaining an inner pressure at a high level.

According to the second embodiment of the present invention, the child seat may include a vent hole for discharging the gas from the airbag. With such a structure, when the airbag receives the head of the child, the gas in the airbag flows out from the vent hole, so that the impact is absorbed. The vent hole may be effective for an airbag of a child seat having the non-return means.

According to the second embodiment of the present invention, an interior of the airbag is communicated with an interior of the cushion without or via the non-return means.

With such a structure, when the cushion receives a load from the side in a side crash, the gas in the cushion moves into the airbag, so that the airbag inflates toward the vicinity of the temporal region of the child, thereby eliminating gas supply means for inflating the airbag. The gas moves (flows out) from the cushion into the airbag, and an impact of the load is absorbed.

According to the second embodiment of the present invention, the cushion may include a gasbag filled with gas. The gasbag has a lightweight and is suitable for the child seat. In such a case, gas-discharge means may be provided for discharging the gas in the gasbag into the airbag to inflate the airbag when the pressure in the gasbag exceeds a predetermined level. With such a structure, the airbag is inflated toward the vicinity of the head of the child by the gas from the gasbag, thereby eliminating gas-generating means for inflating the airbag. The gas flows out from the gasbag to absorb an impact. The gas-discharge means may include a film for partitioning the interior of the gasbag and the interior of the airbag. The film is broken when the gas pressure in the gasbag exceeds a predetermined level.

According to the third embodiment of the present invention, a child seat includes left and right airbags to be inflated on left and right sides of a head of a child sitting in the child seat. In case of an emergency such as a collision or rollover of a vehicle provided with the child seat, the airbags are inflated on the left and right sides of the head of the child for receiving the head of the child from the left and right sides, thereby absorbing an impact on the head of the child. The airbags have capacities large enough to inflate only near the left and right sides of the head of the child. Accordingly, inflating means for inflating the airbags may have a small capacity. The inflating means may include a sensor for detecting a collision or rollover of the vehicle and gas supply means for inflating the airbags based on a detection signal of the sensor.

According to the third embodiment of the present invention, the child seat may include a seat body having a seat portion, a backrest, left and right side guards; airbags to be inflated on the left and right sides of the child's head; and left and right cushions covering lateral surfaces of the child seat provided on outer surfaces of the left and right side guards. The cushions are hollow and filled with gas. A gas passage is provided for connecting the left and right airbags. When one of the cushions is compressed, the gas is introduced into one of the airbags from the corresponding cushion, and flows into the other of the airbags through the gas passage, thereby inflating both of the airbags.

In the child seat, the cushions are disposed along the side surfaces of the child seat outside the side guards for absorbing an impact applied laterally upon a side collision. Even if one of the cushions hits a side surface of the vehicle, the gas in the cushion moves into both of the airbags to inflate the airbags near the left and right sides of the head of the child for receiving the head of the child. It is not necessary to provide gas supply means for inflating the airbags such as an inflator, thereby making the child seat simple and lightweight.

According to the third embodiment of the present invention, the child seat may be provided with non-return means for allowing the gas to flow from the cushions to the airbags and preventing the gas from flowing in the opposite direction. Accordingly, it is possible to prevent the gas in the airbags from flowing back into the cushions when the airbags receive the child's head.

In the child seat, at least one part of the gas passage may be formed like a hose and may expand when the gas passes therethrough. The gas passage has a small size in a normal state and requires only a small space for routing. Furthermore, the gas passage expands when the gas such as air in the cushions flows through the gas passage, thereby functioning as a cushioning material. The cushions may be filled with the gas at a pressure equivalent to or higher than the atmospheric pressure. When the gas in the cushions has a pressure higher than the atmospheric pressure, the airbags can be inflated quickly to a sufficiently large capacity.

According to the fourth embodiment of the present invention, a child seat includes a seat body having a seat section, a backrest section, and left and right side guards; an airbag disposed on the seat body to be inflated around sides of a head of a child; and a hollow cushion disposed on a side surface of the child seat outside the side guards. The airbag is inflated when gas filled in the cushion is supplied into the airbag. The cushion includes local-inflation-preventing means for preventing a part of the cushion from locally expanding when another part of the airbag is pushed. When a vehicle equipped with the child seat has a side collision or a rollover, the cushion absorbs a large lateral impact on the child seat. At this time, the gas in the cushion flows into the airbag to inflate the airbag around the sides of the head of the child, thereby absorbing an impact on the head of the child. The airbag includes the local-inflation-preventing means for preventing a part of the cushion from locally inflating when another part of the cushion is pushed. Accordingly, it is possible to prevent the gas from flowing to the part of the cushion, thereby securely supplying the gas into the airbag.

According to the fourth embodiment of the present invention, the local-inflation-preventing means may include a tether belt or a stay due to a simple configuration. The cushion may include a gasbag filled with gas. The gasbag is lightweight and operates as the cushion for the child seat. The gasbag may be filled with gas at a pressure above the atmospheric pressure. Accordingly, it is possible to inflate a large-volume airbag quickly and widely. The airbag of the child seat may be inflated only around the sides of the head of the child, so that the airbags can be inflated quickly without a large-volume cushion or gasbag, or a high-pressure gas filled in the gasbag for inflating the airbag.

According to the fourth embodiment of the present invention, the child seat may include shape-controlling means for controlling a shape of the airbag in an inflated state. The shape-controlling means includes a simple tether belt. With the shape-controlling means, it is possible to inflate the airbag into a shape and a size corresponding to, for example, a space between the child seat and the side of the head of the child. The child seat may include vent means for releasing the gas in the airbag to absorb an impact. The vent means includes a vent hole formed on the airbag, for example. Accordingly, it is possible to absorb a large amount of the impact.

BRIEF DESCRIPTION OF THE DRAWINGS

FIGS. 2(a) and 2(b) are sectional views of the child seat taken along line 2-2 in FIG. 1, wherein FIG. 2(a) shows the child seat before an airbag is inflated, and FIG. 2(b) shows the child seat after the airbag is inflated;

FIGS. 3(a) and 3(b) are sectional views of a child seat according to another embodiment of the present invention, wherein FIG. 3(a) shows the child seat before an airbag is inflated, and FIG. 3(b) shows the child seat after the airbag is inflated;

FIGS. 5(a) and 5(b) are sectional views of the child seat shown in FIG. 4, wherein FIG. 5(a) shows the child seat before an airbag is inflated and FIG. 5(b) shows the child seat after the airbag is inflated;

FIGS. 6(a) and 6(b) are section views of a chest pad of the child seat, wherein FIG. 6(a) shows the chest pad before the airbag is inflated and FIG. 6(b) shows the chest pad after the airbag is inflated;

FIGS. 11(a) and 11(b) are sectional views of a child seat according to a still further embodiment of the present invention similar to FIGS. 2(a) and 2(b), wherein FIG. 11(a) shows the child seat before an airbag is inflated, and FIG. 11(b) shows the child seat after the airbag is inflated;

FIGS. 12(a) and 12(b) are sectional views of a child seat according to a still further embodiment of the present invention similar to FIGS. 2(a) and 2(b), wherein FIG. 12(a) shows the child seat before an airbag is inflated, and FIG. 12(b) shows the child seat after the airbag is inflated;

FIGS. 13(a) and 13(b) are sectional views of a child seat according to a still further embodiment of the present invention similar to FIGS. 2(a) and 2(b), wherein FIG. 13(a) shows the child seat before an airbag is inflated, and FIG. 13(b) shows the child seat after the airbag is inflated;

FIGS. 14(a) and 14(b) are sectional views of a child seat according to a still further embodiment of the present invention similar to FIGS. 2(a) and 2(b), wherein FIG. 14(a) shows the child seat before an airbag is inflated, and FIG. 11(b) shows the child seat after the airbag is inflated;

FIGS. 15(a) and 15(b) are sectional views of a child seat according to a still further embodiment of the present invention similar to FIGS. 2(a) and 2(b), wherein FIG. 15(a) shows the child seat before an airbag is inflated, and FIG. 15(b) shows the child seat after the airbag is inflated;

FIGS. 16(a) and 16(b) are sectional views of a child seat according to a still further embodiment of the present invention similar to FIGS. 2(a) and 2(b), wherein FIG. 16(a) shows the child seat before an airbag is inflated, and FIG. 16(b) shows the child seat after the airbag is inflated;

FIGS. 17(a) and 17(b) are sectional views of a child seat according to a still further embodiment of the present invention similar to FIGS. 2(a) and 2(b), wherein FIG. 17(a) shows the child seat before an airbag is inflated, and FIG. 17(b) shows the child seat after the airbag is inflated; and FIGS. 18(a) and 18(b) are sectional views of a child seat according to a still further embodiment of the present invention similar to FIGS. 2(a) and 2(b), wherein FIG. 18(a) shows the child seat before an airbag is inflated, and FIG. 18(b) shows the child seat after the airbag is inflated.

DETAILED DESCRIPTION OF PREFERRED EMBODIMENTS

Figure 1:
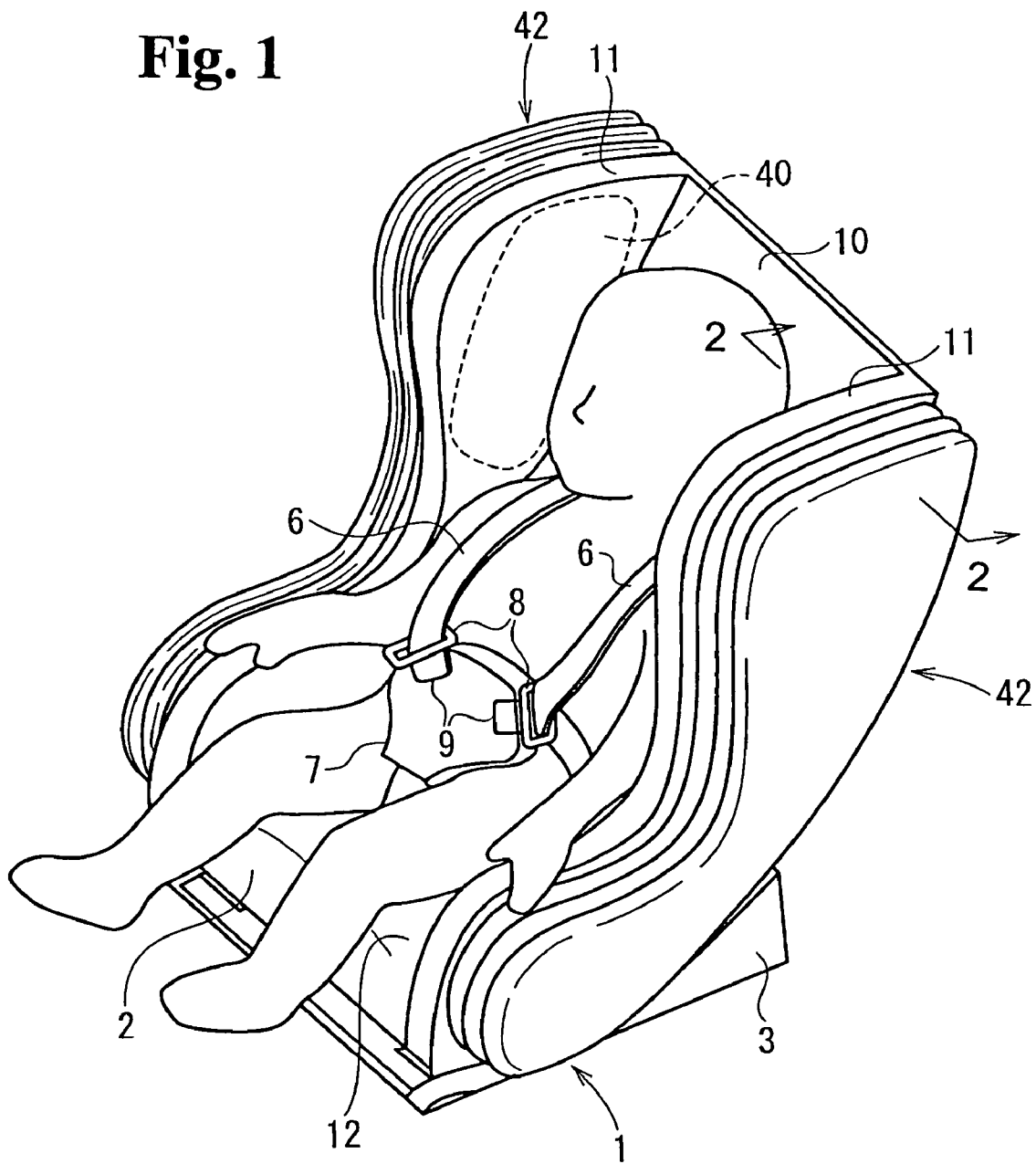
FIG. 1 is a perspective view of a child seat according to an embodiment of the present invention.
Figure 2A:
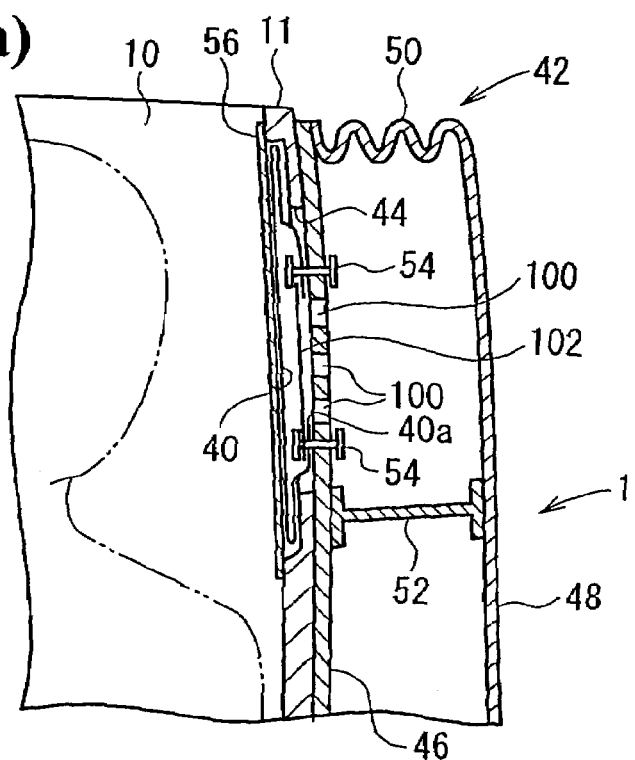
Figure 2B:
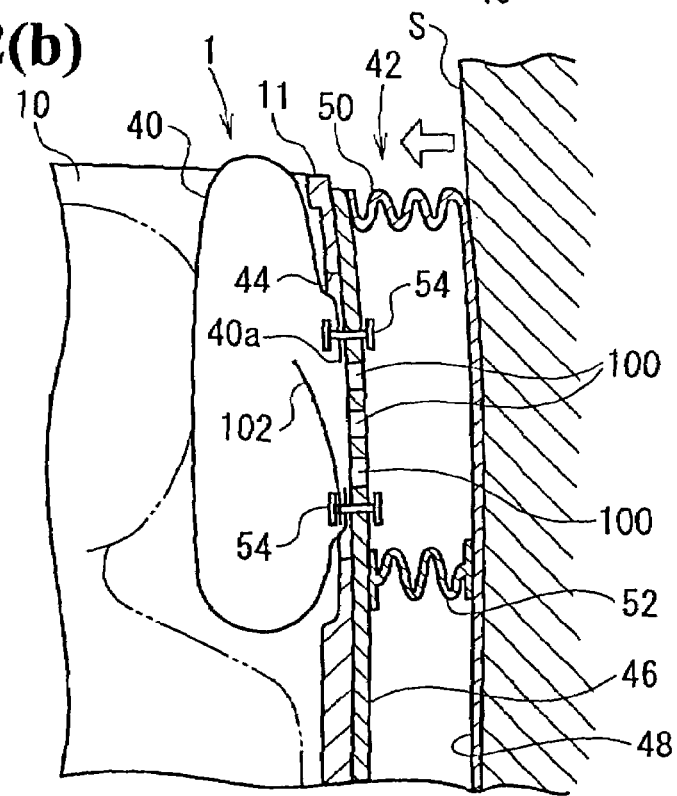

Hereunder, embodiments of the present invention will be explained with reference to the accompanying drawings. FIG. 1 is a perspective view of a child seat according to an embodiment of the present invention. FIGS. 2(a) and 2(b) are sectional views of the child seat taken along line 2-2 in FIG. 1, wherein FIG. 2(a) shows the child seat before an airbag is inflated, and FIG. 2(b) shows the child seat after the airbag is inflated.

As shown in FIG. 1, a child seat 1 includes a seat body 2 for seating a child and a base 3 for supporting the seat body 2 so that the seat body 2 can be reclined. The seat body 2 includes a seat portion 12 for placing a bottom of the child, a backrest 10 for receiving head and back portions of the child, and two side guards 11 extending from left and right sides of the backrest 10 towards a front of the child seat 1. Each of the side guards 11 extends from an edge of the backrest 10 to a left or right edge of the seat portion 12.

The seat body 2 has two child seatbelts 6 for restraining the child. The child seatbelts 6 extend through two belt tongues 8. A pad 7 is vertically disposed on a front of the seat portion 12. The pad 7 has two buckles 9 for latching the two respective belt tongues 8.

A rear portion of each of the child seatbelts 6 is drawn into the backrest 10 and is wound around a seatbelt retractor (not shown in the drawings) with an emergency lock mechanism provided inside the seat body 2. In case of an automobile collision, the retractor is activated and locked, thereby preventing the child seatbelt 6 from being pulled out. The seatbelt retractor may be omitted. The child seat 1 is fixed on a seat of the automobile (not shown in the drawings) with a seatbelt 14. Reference numeral 13 represents an opening for passing through the seatbelt 14. The child is seated on the seat body 2, and the child seatbelts 6 are fastened. Then, the belt tongues 8 of the seatbelts 6 are latched into each of the buckles 9.

In this embodiment, two airbags 40 are installed in upper inner sides of the left and right side guards 11, and hollow cushions 42 are attached to outer surfaces of the side guards 11. Each of the airbags 40 communicates with the corresponding cushion 42 through an opening 44 formed in an upper portion of the side guard 11. The cushion 42 has a communicating portion 100 for communicating between an inner space of the cushion 42 and an inner space of the airbag 40. Each of the airbags 40 has a gas inlet 40a so that gas flows from the cushion 42 via the communicating portion 100. The communicating portion 100 has a check valve 102 as reverse-flow prevention means for allowing the gas to flow into the airbag 40 from the cushion 42 while preventing the gas from flowing in the opposite direction.

In this embodiment, the gas filled in the cushions 42 is air (atmospheric air). As shown in FIG. 2(b), the airbags 40 have a size to be inflated only around the head of the child sitting in the child seat 1. As shown in FIG. 1, the two cushions 42 extend along the outer surfaces of the side guards 11 from the edges of the backrest 10 to the left and right edges of the seat portion 12.

Each of the cushions 42 includes a base plate 46 attached to the outer surface of one of the side guards 11; a load-bearing surface 48 located at a side opposite to the one of the side guards 11; a peripheral wall 50 connecting the base plate 46 and the load-bearing surface 48; and a stay 52 for controlling a distance between the base plate 46 and the load-bearing surface 48. In this embodiment, the base plate 46 and the load-bearing surface 48 have a shape substantially same as a surface of the side guards 11 for entirely covering the surface of the side guard 11. The peripheral wall 50 has a bellow structure for contracting in a direction that the base plate 46 approaches the load-bearing surface 48.

In this embodiment, the load-bearing surface 48 is integrated with the peripheral wall 50, wherein an edge of the peripheral wall 50 separated from the load-bearing surface 48 is mounted airtight onto a circumference of the base plate 46. The load-bearing surfaces 48 and the peripheral walls 50 are formed of a semi-rigid synthetic resin, and are covered with non-woven fabric.

The stay 52 is disposed across the base plate 46 and the load-bearing surface 48. When the child seat receives a load greater than a predetermined value in the direction toward the base plate 46, the stay 52 buckles for allowing the load-bearing surface 48 to come closer to the base plate 46.

A communicating portion 100 is provided at an upper portion of the base plate 46 for communication between the cushion 42 and the airbag 40. The communicating portion 100 is disposed inside the opening 44 located on an upper portion of the side guard 11. In this embodiment, the communicating portion 100 includes a plurality of small holes formed adjacent to each other.

The gas inlet 40a on the airbag 40 overlaps with the base plate 46 at a periphery thereof so that the communicating portion 100 is disposed inside the gas inlet 40a. The circumference of the gas inlet 40a on the airbag 40 is bonded airtightly with the base plate 46. Reference numeral 54 represents a fixing device such as a rivet for fixing the periphery of the gas inlet 40a on the airbag 40 to the base plate 46.

In this embodiment, a check valve 102 is a sheet. As shown in FIG. 2(a), the check valve 102 overlaps with a surface of the base plate 46 for covering the communicating portion 100 from a side of the airbag 40. As shown in FIG. 2(a), a lower portion of the check valve 102 is fixed to the surface of the base plate 46 with the fixing device 54 along with a lower periphery of the gas inlet 40a on the airbag 40. The upper portion of the check valve 102 is pressed against the surface of the base plate 46 with the fixing device 54 for fixing the upper periphery of the gas inlet 40a on the airbag 40 to the base plate 46. The check valve 102 is disposed inside the periphery of the gas inlet 40a (on the inner side of the airbag 40).

As shown in FIG. 2(b), when the gas in the cushion 42 moves to the airbag 40 through the communicating portion 100, the upper portion of the check valve 102 is released from the fixing device 54 due to the pressure of the gas and is detached from the surface of the base plate 46. As a result, the communicating portion 100 opens and the gas flows from the cushion 42 into the airbag 40. When the gas tries to move from the airbag 40 into the cushion 42 through the communicating portion 100, the pressure of the gas presses the check valve 102 against the surface of the base plate 46, so that the communicating portion 100 is closed, thereby preventing the gas from flowing into the cushion 42 from the airbag 40.

In this embodiment, the check valve 102 is composed of a rubber sheet, so that the check valve 102 easily changes from a flat state to a curved state and elastically restores to an original flat state once released from the curved state. The check valve 102 may be an elastic resin sheet, a thin metal sheet, or fabric other than the rubber sheet.

When the cushion 42 is installed onto the side guard 11, first, the airbag 40 is inserted through the opening 44 from the outside of the side guard 11, and the base plate 46 is bonded to the outer surface of the side guard 11. The airbag 40 disposed at the inside of the side guard 11 through the opening 44 is folded in a flat state along the inner surface of the side guard 11. As shown in FIG. 2(a), the periphery of the opening 44 at the inner side of the side guard 11 is formed in a recess portion, and the folded airbag 40 is disposed in the recess portion. A cover sheet 56 covers the folded airbag 40 and the recess portion from the inner side of the side guard 11. When the airbag 40 is inflated, the cover sheet 56 breaks due to a pressure of the airbag 40.

As shown in FIG. 2(b), when a side surface S of the automobile collides with the child seat 1 with the arrangement described above in a side collision, the load-bearing surface 48 of the cushion 42 receives a load of the side surface S. When the load of the compartment side surface S exceeds a predetermined value, the stay 52 buckles, thereby moving the load-bearing surface 48 toward the base plate 46 and absorbing the impact.

When the load-bearing surface 48 approaches the base plate 46, the volume of the cushion 42 is reduced, and the gas contained in the cushion 42 moves to the airbag 40 via the communicating portion 100. As shown in FIG. 2(b), the gas from the cushion 42 causes the airbag 40 to break through the cover sheet 56 and be inflated between the side guard 11 and the child's head. Thus, the airbag 40 receives the child's temporal and absorbs the impact on the child's head.

In the child seat 1, the communicating portion 100 communicating between the cushion 42 and the airbag 40 has the check valve 102 for allowing the gas to flow into the airbag 40 from the cushion 42 while preventing the gas from flowing in the opposite direction. When the airbag 40 receives the child's temporal, the check valve 102 prevents the gas from escaping from the airbag 40 into the cushion 42. As a result, the airbag 40 firmly receives the child's temporal.

The inflated airbags 40 of the child seat 1 do not project out of the sides of the seat body 2. Therefore, even if a person sits closely next to the child seat 1, an unexpected external pressure will not be applied to the person. Furthermore, when the child seat 1 collides with the person, the cushion 42 absorbs an impact. In this embodiment, the airbags 40 communicate with the cushions 42. When a load is applied, a volume of the cushions 42 is reduced, and the gas inside the cushions 42 moves to the airbags 40, thereby inflating the airbags 40 without an inflator.

Figure 3A:
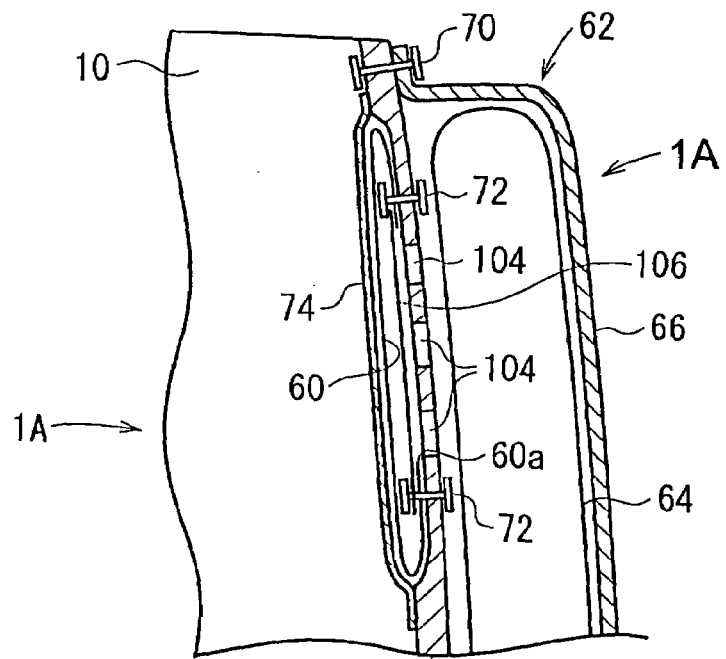
Figure 3B:
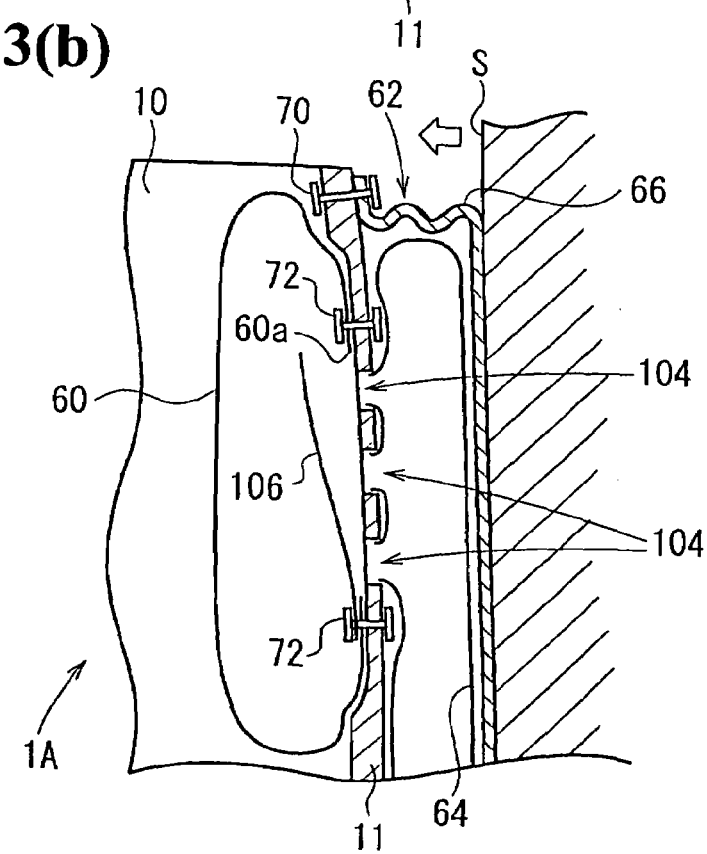

FIGS. 3(a) and 3(b) are sectional views of a child seat according to another embodiment of the present invention, wherein FIG. 3(a) shows the child seat before an airbag is inflated, and FIG. 3(b) shows the child seat after the airbag is inflated. In this embodiment, airbags 60 are provided on upper inner sides of the left and right side guards 11. A cushion 62 is provided on the outer side of each of the side guards 11. As shown in FIG. 3(b), the airbags 60 have a size to be inflated only around the temporal of the child seated in a child seat 1A. Each of the cushions 62 extends from an edge of the backrest 10 to the left or right edge of the seat portion 12 along the outer surface of the side guard 11.

The cushion 62 includes a gasbag 64 for inflating the airbag 60 and a cover shield 66 for covering the gasbag 64. The gasbag 64 is disposed along the outer surface of the side guard 11. The circumference of the cover shield 66 is bonded airtightly to the side surface of the side guard 11. Reference numeral 70 represents a fixing device for fixing the cover shield 66 to the side guard 11. The gasbag 64 is formed of a thin film of a synthetic resin and is structured so that the bag breaks when an inner pressure thereof exceeds a predetermined value for supplying the gas. The gasbag 64 contains pressurized air (for example, air pressurized at about 1.5 to 3 times greater than the atmospheric pressure). The load-bearing surface 48 and the peripheral surface 50 of the cushion 42, and the cover shield 66 are formed of a semi-rigid synthetic resin covered with non-woven fabric.

A communicating portion 104 is provided at an upper portion of the side guard 11 for introducing the gas from the gasbag 64 into the airbag 60. The gasbag 64 is disposed to overlap with the communicating portion 104. In this embodiment, the communicating portion 104 includes a plurality of small holes arranged adjacent to each other. The airbag 60 has a gas inlet 60a for allowing the gas to enter therein from the gasbag 64 via the communicating portion 104. A periphery of the gas inlet 60a on the airbag 60 overlaps with the side guard 11 so that the communicating portion 104 is disposed inside the gas inlet 60a. The periphery of the gas inlet 60a on the airbag 60 is bonded airtightly with the side guard 11. Reference numeral 72 represents a fixing device such as a rivet for fixing the periphery of the gas inlet 60a on the airbag 60 to the side guard 11.

The communicating portion 104 has reverse-flow prevention means for allowing the gas to flow into the airbag 60 from the gasbag 64 while preventing the gas from flowing in the opposite direction. The check valve 106 is a sheet similar to the check valve 102 used in the embodiment shown in FIGS. 1, 2(a) and 2(b). The check valve 106 overlaps with the inner surface of the side guard 11 for covering the communicating portion 104 from a side of the airbag 60.

As shown in FIG. 3(a), the lower portion of the check valve 106 is bonded to the side surface of the side guard 11 along with the lower periphery of the gas inlet 60a on the airbag 60 with a fixing device 72. The upper portion of the check valve 106 is pressed against the surface of the side guard 11 with the fixing device 72 for fixing the upper periphery of the gas inlet 60a on the airbag 60 to the side guard 11. As shown in FIG. 3(a), the check valve 106 is disposed inside the periphery of the gas inlet 60a (on the inner side of the airbag 60). When the gas flows from the gasbag 64 into the airbag 60 via the communicating portion 104, the upper portion of the check valve 106 is released from the fixing device 72 due to the gas pressure and is detached from the surface of the side guard 11. Accordingly, the communicating portion 104 opens, and the gas flows from the gasbag 64 into the airbag 60. When the gas tries to move from the airbag 60 to the gasbag 64 via the communicating portion 104, the pressure of the gas presses the check valve 106 against the surface of the side guard 11, thereby closing the communicating portion 104, and preventing the gas from flowing to the gasbag 64 from the airbag 60.

The airbag 60 is folded in a flat state along the inner surface of the side guard 11. As shown in FIG. 3(a), in this embodiment, a recess portion is formed at a periphery of an opening 68 at the inside of the side guard 11, and the airbag 60 is disposed in the recess portion. A cover sheet 74 covers the airbag 60 and the recess portion from the inside of the side guard 11. The cover sheet 74 breaks due to a pressure applied when the airbag 60 is inflated.

Other structures of the child seat 1A are the same as those of the child seat 1 shown in FIGS. 1, 2(a) and 2(b). Reference numerals in FIGS. 3(a) and 3(b) represent the same components as those in FIGS. 1, 2(a) and 2(b).

As shown in FIG. 3(b), when the side surface S of an automobile collides with the child seat 1A structured as described above in a side collision, the cushion 62 receives the side surface S. When the inner pressure of the gasbag 64 exceeds a predetermined value, a part of the gasbag 64 facing the communicating portion 104 breaks. As a result, the gas in the gasbag 64 flows to the airbag 60 via the communicating portion 104 and the airbag 60 is inflated.

As shown in FIG. 3(b), the airbag 60 breaks through the cover sheet 74 and is inflated between the child's head and the side guard 11 for receiving the child's temporal and absorbing the impact to the child's head. At the same time, the gas in the gasbag 64 flows out to absorb the impact to the child seat 1A from the side surface S. In the child seat 1A, the communicating portion 104 has a check valve 106 for allowing the gas to flow into the airbag 60 from the gasbag 64 while preventing the gas from flowing in the opposite direction. When the airbag 60 receives the child's temporal, the check valve 104 prevents the gas from escaping from the airbag 60 into the gasbag 64, thereby firmly receiving the child's temporal.

Figure 4:
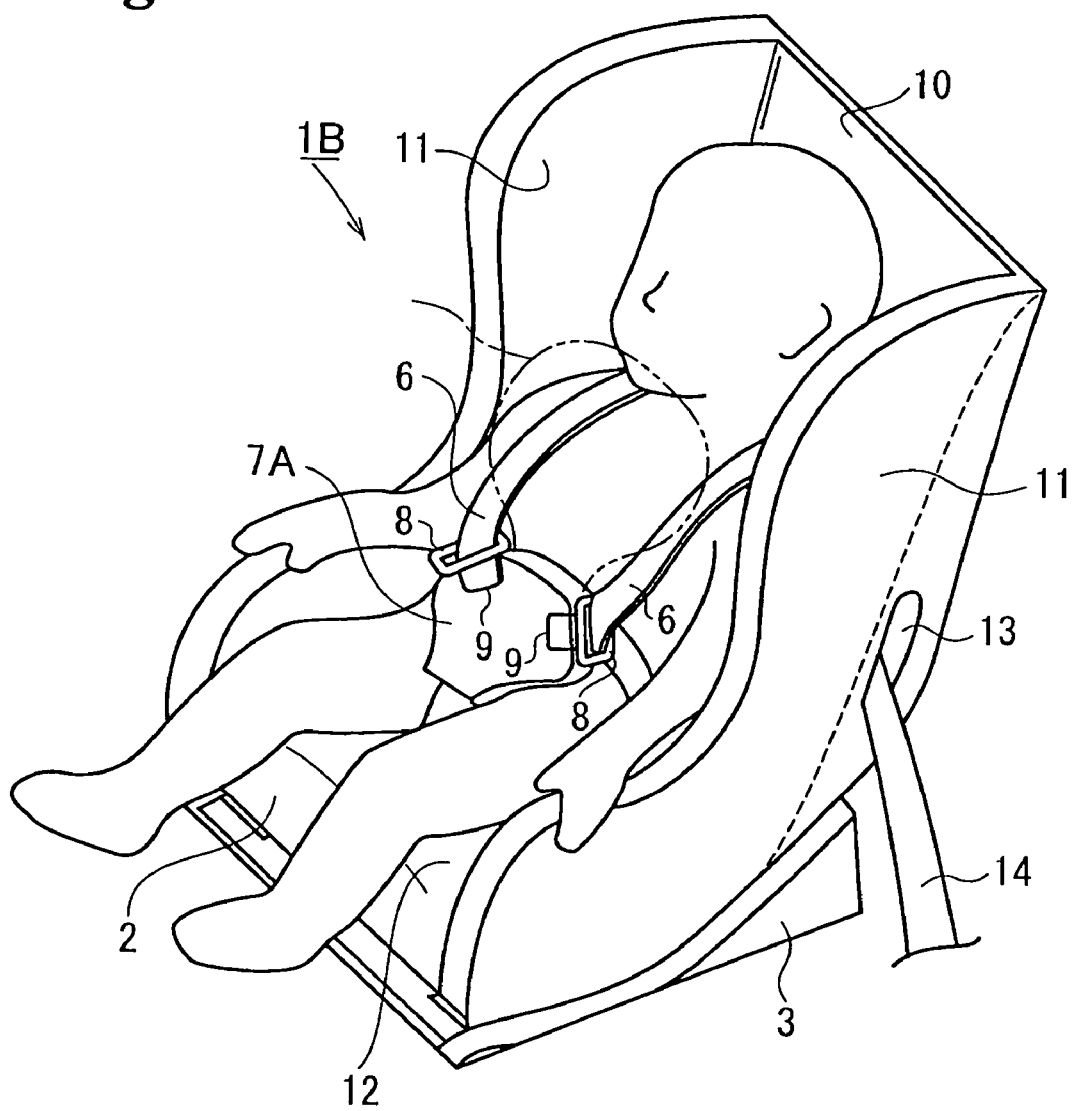
FIG. 4 is a perspective view of a child seat according to a further embodiment of the present invention.
Figure 5A:
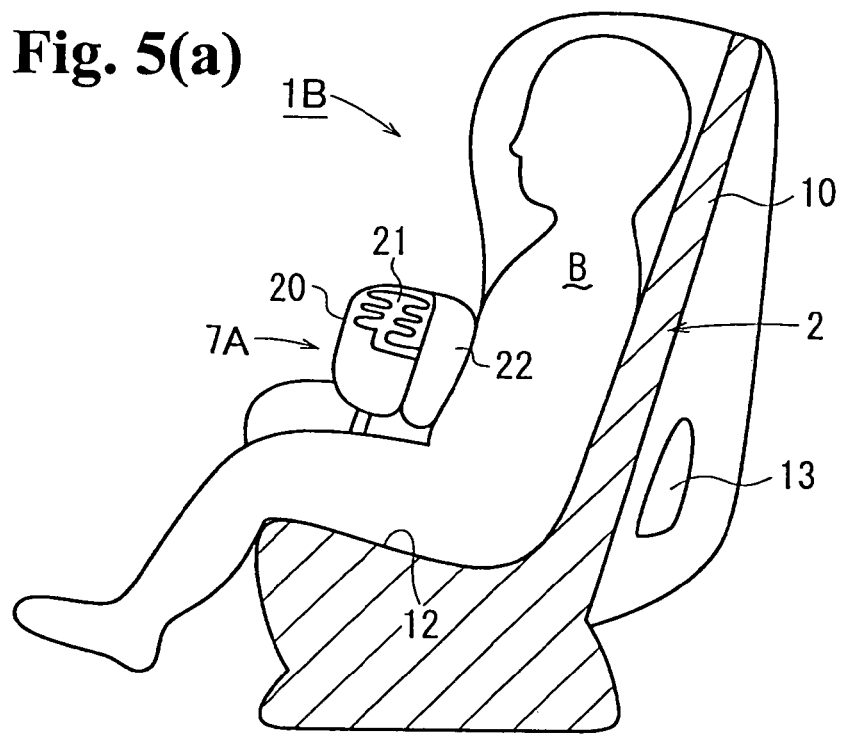
Figure 5B:
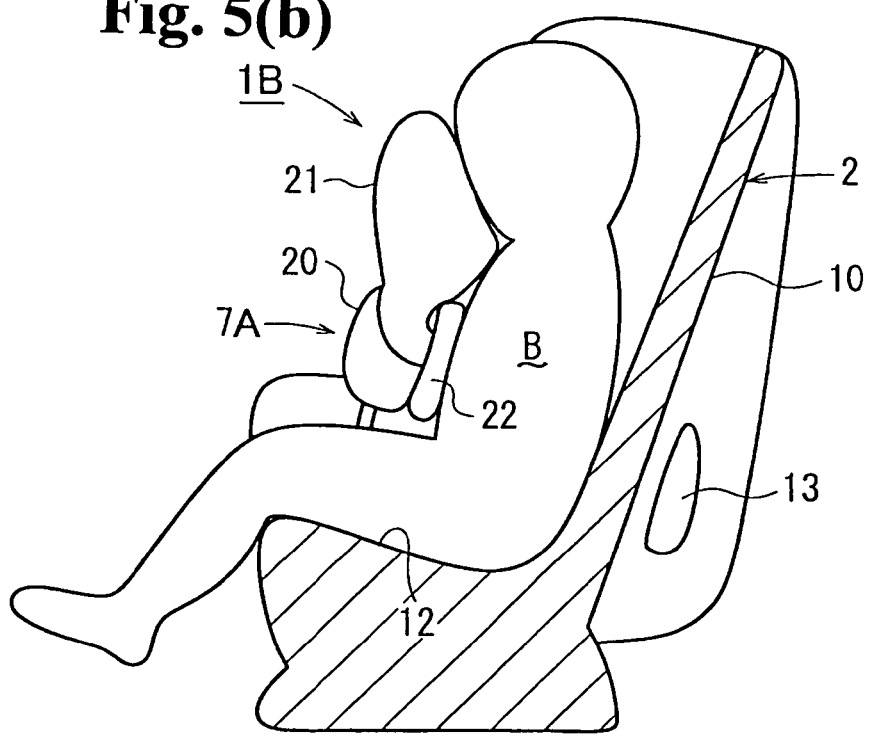
Figure 6B:
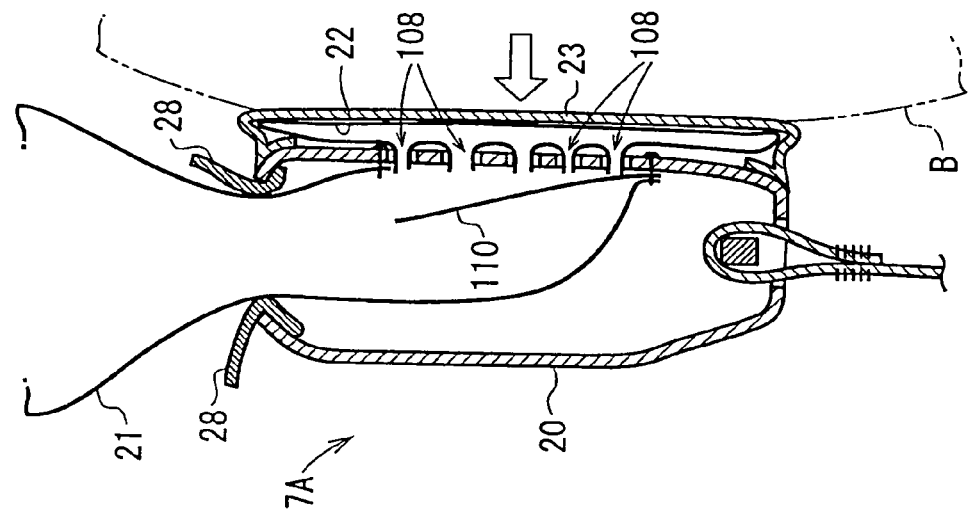
Figure 6A:
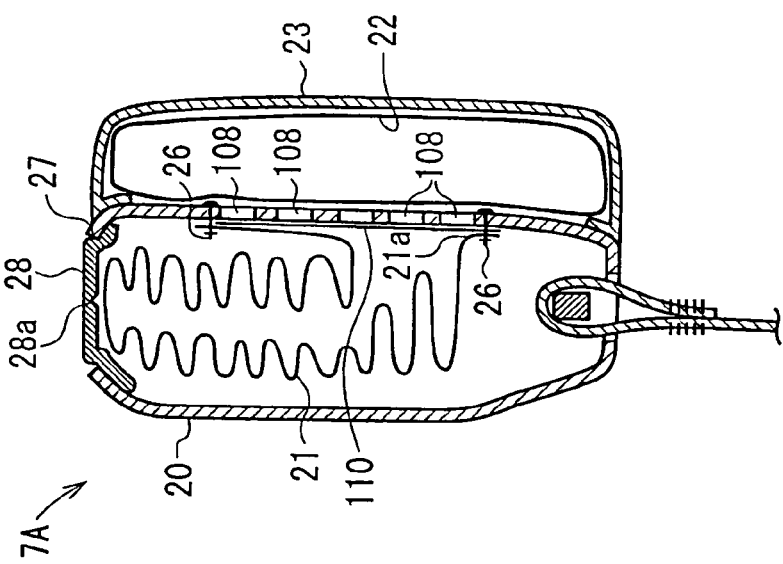

FIG. 4 is a perspective view of a child seat of a further embodiment. FIGS. 5(a) and 5(b) are sectional views of the child seat shown in FIG. 4, wherein FIG. 5(a) shows the child seat before an airbag is inflated and FIG. 5(b) shows the child seat after the airbag is inflated. FIGS. 6(a) and 6(b) are section views of a chest pad of the child seat, wherein FIG. 6(a) shows the pad before the airbag is inflated and FIG. 6(b) shows the pad after the airbag is inflated.

As shown in FIG. 4, a child seat 1B includes a seat body 2 for seating a child and a base 3 for supporting the seat body 2 so that the seat body 2 can be reclined. The seat body 2 includes a seat portion 12 for placing a bottom of a child, a backrest 10 for placing a head and a back of the child, and two side guards 11 extending from left and right sides of the backrest 10 towards a front of the child seat 1. Each of the two side guards 11 extends from an edge of the backrest 10 to a left or right edge of the seat portion 12. The seat body 2 has two child seatbelts 6 for restraining the child. The child seatbelts 6 extend through the respective belt tongues 8. A pad 7A is vertically disposed on a front side of the seat portion 12. The pad 7A has two buckles 9 for latching the respective belt tongues 8.

In this embodiment, as shown in FIGS. 6(a) and 6(b), the pad 7A includes a hollow shell case 20, an airbag 21 folded and stored in the case 20, a gasbag 22 for inflating the airbag 21, and a cover shield 23 for covering the gasbag 22. The gasbag 22 is disposed on an outside of a rear surface (a surface facing a body of the child B) of the case 20. The cover shield 23 is mounted on the rear surface of the case 20.

Similar to the gasbag 64 shown in FIGS. 3(a) and 3(b), the gasbag 22 is formed of a thin film of a synthetic resin and is structured so that the bag breaks when an inner pressure thereof exceeds a predetermined value for allowing the gas contained therein to flow out. The gasbag 22 contains pressurized air (for example, air pressurized at about 1.5 to 3 times greater than the atmospheric pressure). Similar to the cover shield 66 shown in FIGS. 3(a) and 3(b), the cover shield 23 is formed of a semi-rigid synthetic resin covered with non-woven fabric.

The rear surface of the case 20 has a communicating portion 108 for introducing the gas from the gasbag 22 into the airbag 21. The gasbag 22 is disposed to overlap with the communicating portion 108. In this embodiment, the communicating portion 108 includes a plurality of small holes located adjacent to each other. The airbag 21 has a gas inlet 21a for the gas to flow in from the gasbag 22 via the communicating portion 108. The periphery of the gas inlet 21a on the airbag 21 overlaps with the rear surface of the case 20 so that the communicating portion 108 is disposed inside the gas inlet 21a. The circumference of the gas inlet 21a on the airbag 21 is bonded airtightly with the rear surface of the case 20. Reference numeral 26 represents a fixing device such as a rivet for fixing the periphery of the gas inlet 21a on the airbag 21 to the rear surface of the case 20.

The communicating portion 108 has reverse-flow prevention means, i.e. check valve, for allowing the gas to flow into the airbag 21 from the gasbag 22 for preventing the gas from flowing in the opposite direction. The check valve 110 is a sheet similar to the check valves 102 and 106 shown in FIGS. 2(a) and 3(a). The check valve 110 overlaps with the rear surface of the case 20 for covering the communicating portion 108 from a side of the airbag 21.

As shown in FIG. 6(a), a lower portion of the check valve 110 is bonded to the rear surface of the case 20 along with a lower periphery of the gas inlet 21a of the airbag 21 with the fixing device 26. An upper portion of the check valve 110 is pressed against the rear surface of the case 20 with the fixing device 26 for fixing the upper periphery of the gas inlet 21a of the airbag 21 to the rear surface of the case 20.

As shown in FIG. 6(b), when the gas from the gasbag 22 flows into the airbag 21 via the communicating portion 108, the upper portion of the check valve 110 is released from the fixing device 26 due to the gas pressure and is detached from the rear surface of the case 20. Accordingly, the communicating portion 108 opens, and the gas is allowed to flow from the gasbag 22 into the airbag 21.

When the gas tries to move from the airbag 21 to the gasbag 22 via the communicating portion 108, the check valve 110 is pressed against the rear surface of the case 20 due to the gas pressure, thereby closing the communicating portion 108, and preventing the gas from flowing to the gasbag 22 from the airbag 21.

An opening 27 is provided on the upper surface of the case 20. The opening 27 is closed with a cover 28. The cover 28 has a tear line 28a. Other structures of the child seat 1B are the same as those of the child seat 1 shown in FIGS. 1, 2(a), and 2(b). Reference numerals shown in FIGS. 4, 5(a), 5(b), 6(a) and 6(b) represent the same components as shown in FIGS. 1, 2(a) and 2(b).

In the child seat 1B structured as described above, when the child B moves forward at a rate exceeding a predetermined rate in an automobile collision, the gasbag 22 is pressed via the cover shield 23 and the gas pressure inside the gasbag 22 exceeds a predetermined value. As a result, a part of the gasbag 22 facing the communicating portion 108 breaks, and the gas in the gasbag 22 flows out into the airbag 22 via the communicating portion 108, thereby inflating the airbag 21.

The airbag 21 pushes the cover 28 from the back, and the cover 28 tears along the tear line 28a. The airbag 21 expands through the opening 27 vertically from the pad 7A. The airbag 21 receives the child's head as shown in FIG. 5(b), and absorbs an impact on the child's head. An upper portion of the airbag 21 is inflated under the child's chin to prevent the child's neck from bending forwards and to absorb the impact. The gas inside the gasbag 22 flows out via the communicating portion 108 to absorb an impact on the child's chest or abdomen colliding with the cover shield 23.

In the child seat 1B, the communicating portion 108 for introducing the gas from the gasbag 22 into the airbag 21 has a check valve 110 for allowing the gas to flow into the airbag 21 from the gasbag 22 while preventing the gas from flowing in the opposite direction. When the airbag 21 receives the child's body, the check valve 110 prevents the gas from escaping from the airbag 21 to the gasbag 22, so that the airbag 21 firmly receives the child's body.

In the child seat 1B, when the child's body pushes the gasbag 22, the gas is released from the gasbag 22 to inflate the airbag 21. Therefore, it is not necessary to provide an inflator, thereby making the structure of the child seat 1B simple and lightweight.

In this embodiment, the gas filled in the gasbag 22 is pressurized at a pressure higher than the atmospheric pressure. The pressure may be under the atmospheric pressure.

In such a case, the gasbag may have a volume greater than that of the gasbag 22, so that the airbag is inflated to a sufficiently large size. A hollow cushion such as the cushion 42 shown in FIGS. 1, 2(a) and 2(b) may be mounted on the rear surface of the case 20 instead of the gasbag 22. The cushion may communicate with the airbag 21 at a communicating portion with a check valve. While the airbag is installed in the pad, the airbag may be installed in other load-bearing members such as an impact shield.

Figure 7:
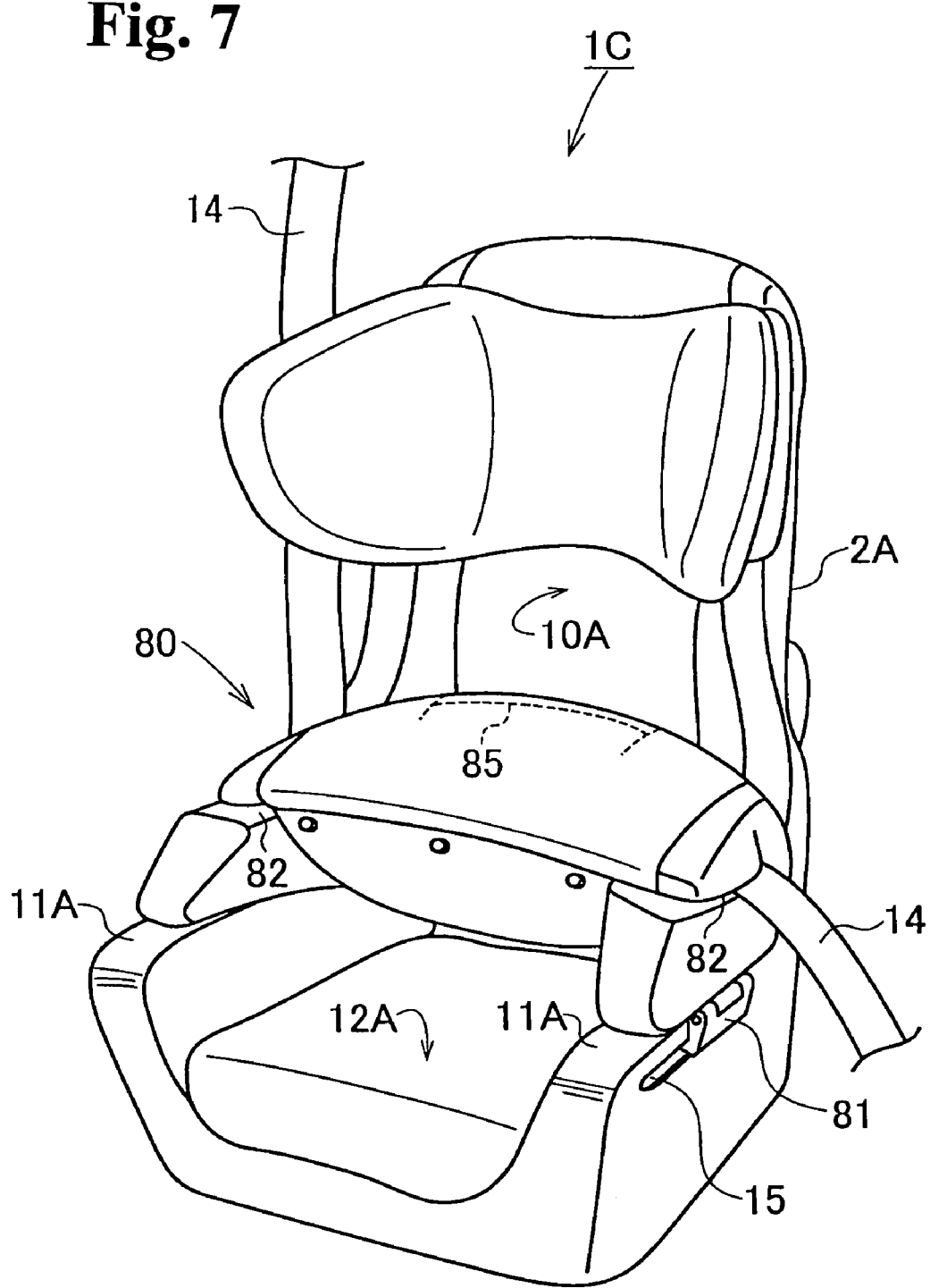
FIG. 7 is a perspective view of a child seat according to a still further embodiment of the present invention.
Figure 8A:
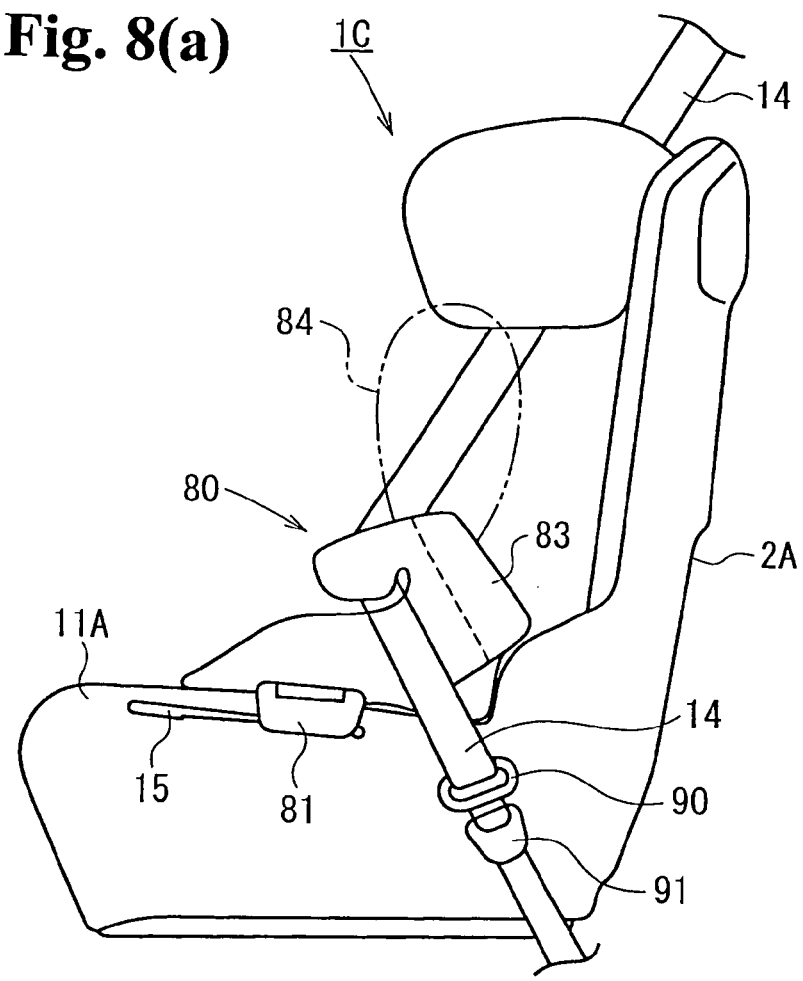
FIG. 8(a) is a side view of the child seat shown in FIG. 7.
Figure 8B:
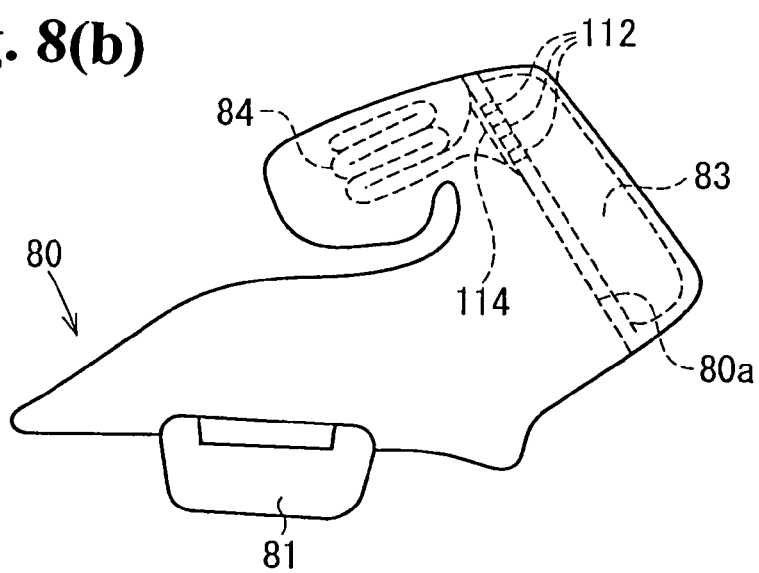
FIG. 8(b) is a side view of an impact shield.

FIG. 7 is a perspective view of a child seat according to a still further embodiment of the present invention. FIG. 8(a) is a side view of the child seat shown in FIG. 7, and FIG. 8(b) is a side view of an impact shield. A child seat 1C includes a child seat body 2A and an impact shield 80. The child seat body 2A includes a seat portion 12A, a backrest 10A, and left and right side guards 11A.

On outer surfaces of the left and right side guards 11A, grooves 15 are provided from a rear side to a front side of the child seat 1C. The impact shield 80 extends between the right and left side guards 11A. On left and right lower portions of the impact shield 80, hooks 81 are provided. Each of the hooks 81 is latched onto each of the grooves 15 to fix the impact shield 80 so that the impact shield 80 extends between the left side guard 11A and the right side guards 11A. On the left and right sides of the impact shield 80, slits 82 extend from the front. By passing the seatbelt 14 through each slit 82, the child seat 1C is fixed to an automobile seat, while the impact shield 80 is fixed to the child seat 1C. A tongue 90 of the seatbelt 14 is latched into a buckle 91.

As shown in FIG. 8(b), a gasbag 83 is disposed along a rear surface 80a of the impact shield 80. The gasbag 83 has a structure same as the gasbag 22 described above. An airbag 84 is disposed inside the upper surface of the impact shield 80 to be inflated with the gas from the gasbag 83. On an upper portion of the impact shield 80, a tear line 85 is provided, and the tear line 85 tears when the airbag 84 is inflated. The rear surface 80a of the impact shield 80 has a communicating portion 112 for introducing the gas into the airbag 84 from the gasbag 83. A periphery of the gas inlet (no reference numeral) of the airbag 84 is mounted onto the rear surface 80a of the impact shield 80 with a fixing device such as a rivet (not shown), so that the communicating portion 112 is located inside the gas inlet.

In this embodiment, a check valve 114 is provided on the communicating portion 112. The check valve 114 has a structure same as the check valve 110 shown in FIG. 3(a). The check valve 114 overlaps with the rear surface of the impact shield 80 so that the communicating portion 112 is covered from a side of the airbag 84. When the gas from the gasbag 83 flows into the airbag 84 via the communicating portion 112, the check valve 114 is detached from the rear surface of the impact shield 80 due to the gas pressure, and the communicating portion 112 opens, thereby allowing the gas to flow from the gasbag 83 into the airbag 84. When the gas tries to move from the airbag 84 to the gasbag 83 via the communicating portion 112, the check valve 114 is pressed against the rear surface of the impact shield 80 due to the gas pressure, thereby closing the communicating portion 112 and preventing the gas from flowing into the gasbag 83 from the airbag 84.

In an automobile collision, the child sitting in the child seat 1C is pressed against the gasbag 83, thereby causing the gas pressure inside the gasbag 83 to exceed a predetermined value. As a result, the gas inside the gasbag 83 is introduced into the airbag 84, thereby causing the airbag 84 to break through an upper surface of the impact shield 80 and to be inflated upward as shown by phantom line in FIG. 8(a), so that the airbag 84 receives the child's head and absorbs the impact.

In the child seat 1C, the communicating portion 112 for introducing the gas from the gasbag 83 into the airbag 84 has the check valve 114 for allowing the gas to flow into the airbag 84 from the gasbag 83 while preventing the gas from flowing in the opposite direction. When the airbag 84 receives the child's body, the check valve 114 prevents the gas from escaping from the airbag 84 into the gasbag 83, so that the airbag 84 firmly receives the child's body.

According to the present invention, the chest pad 7A may include shape regulating means for regulating a shape of the airbag when the airbag is inflated; venting means for releasing the gas from the airbag to absorb an impact; or local-bulging preventing means for preventing a local bulging of the gasbag when the gasbag is pressed.

Figure 9:
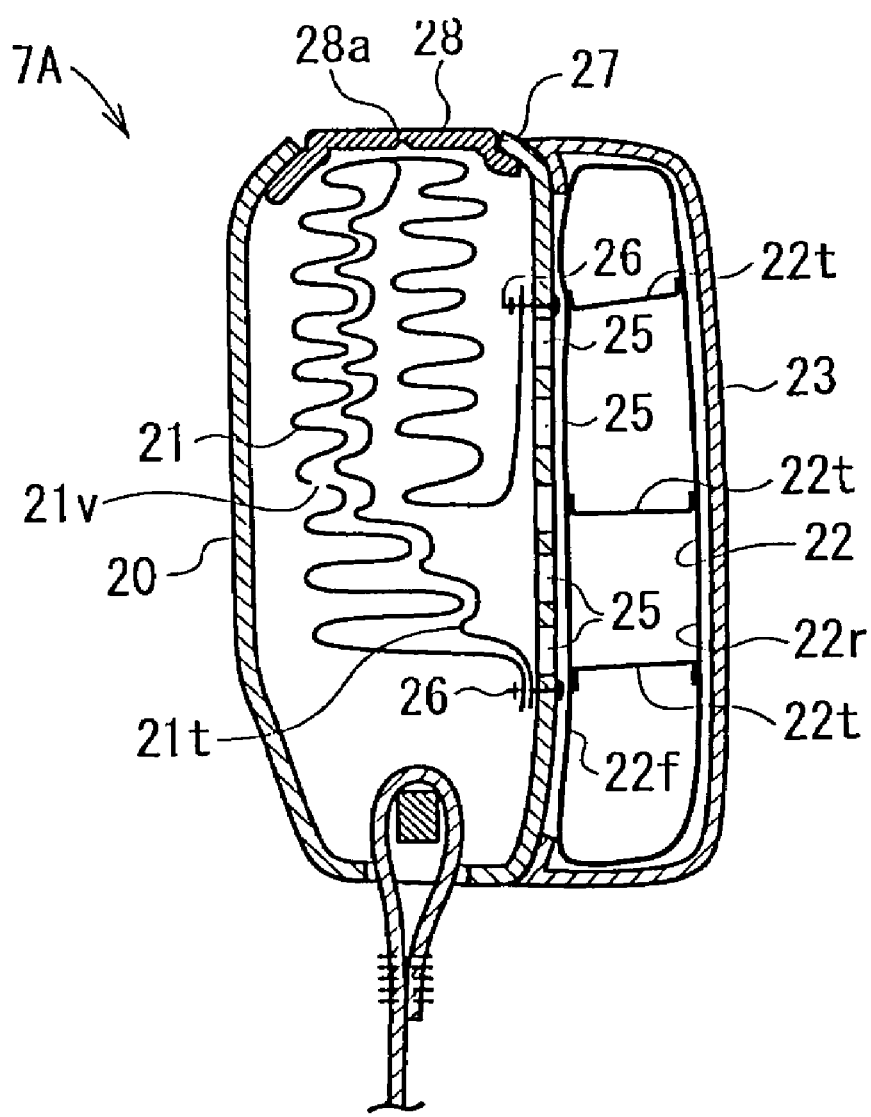
FIG. 9 is a sectional view of a chest pad of a child seat according to a still further embodiment.
Figure 10:
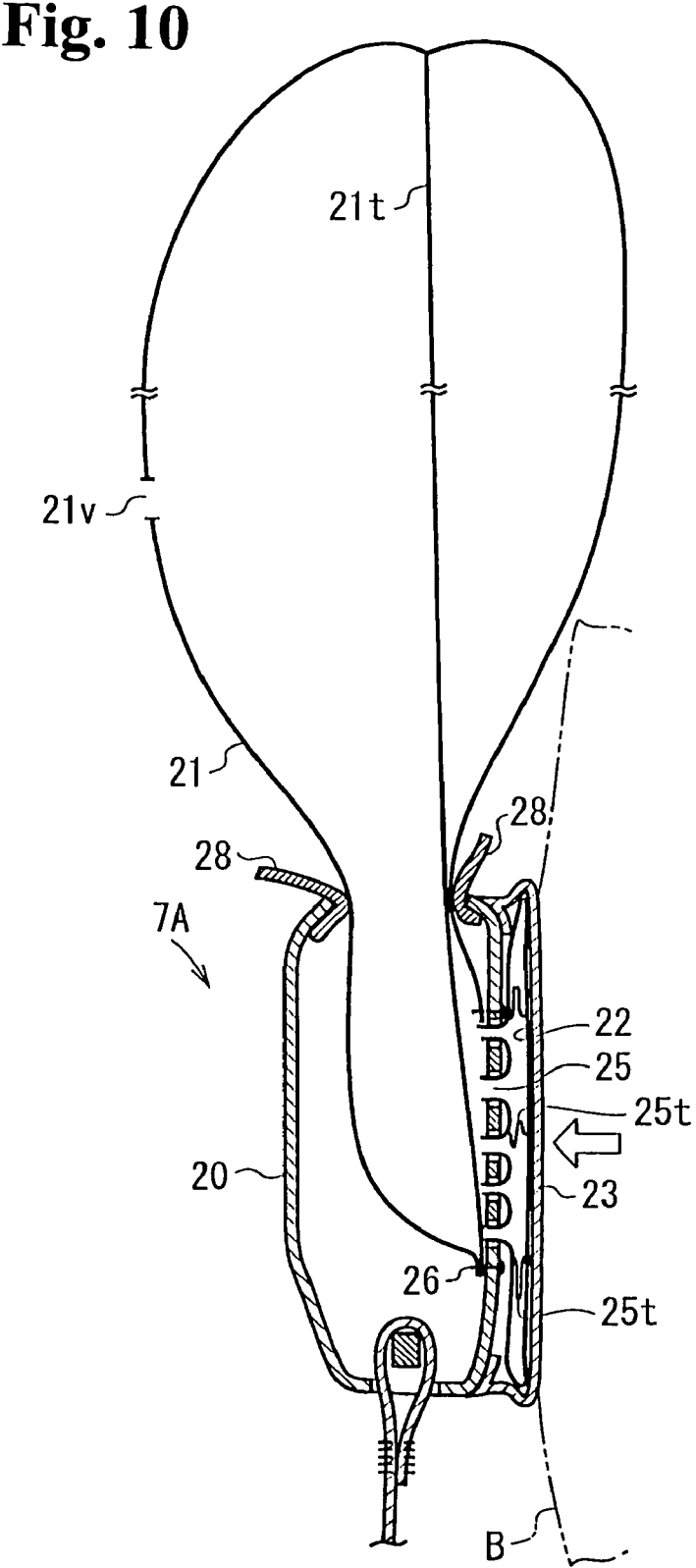
FIG. 10 is a sectional view of the chest pad similar to the chest pad of FIG. 6 when an airbag is inflated.

FIG. 9 and FIG. 10 are sectional views of the pad 7A including an airbag tether strap as the shape regulating means, a vent hole as the venting means, and a gas-bag tether strap as the local-bulging preventing means. In the chest pad 7A, one end of an airbag tether strap 21t is connected to an upper portion of the airbag 21. The other end of the tether strap 21t is connected to the rear surface of the casing 20 with the fastener 26. The tether strap 21t has an elongated shape and the one end thereof is attached to the upper portion of the airbag 21 with attaching means such as stitching or bonding. A plurality of the tether straps 21t may be provided. The tether straps may not only be provided vertically along the airbag 21, but also longitudinally or laterally in the horizontal direction of the airbag 21.

A vent hole 21v is provided in the front surface of the airbag 21 above the casing 20 when the airbag 21 is inflated. In this embodiment, one vent hole 21v is provided, and alternatively, two or more vent holes 21v may be provided. The vent hole 21v may also have pressure-maintaining means such as a film for sealing the vent hole 21v until the pressure inside the airbag 21 reaches a specific value. When the pressure inside the airbag 21 exceeds the specific value, the film opens (for example, breaks).

In this embodiment, the front surface 22f of the gasbag 22 (the surface facing the casing 20) and the rear surface 22r (the surface facing the child) are connected with tether straps 22t. The tether straps 22t are formed of, for example, a synthetic resin or fabric impregnated with a synthetic resin. Ends of the straps 22t are attached to the front surface 22f and the rear surface 22r with bonding. The material and the bonding method of the tether straps 22t are not limited to the embodiment described above. Although three tether straps 22t are provided, the number of the straps 22t is not limited. Furthermore, the straps 22t may be disposed not only laterally across the gasbag, but also longitudinally or vertically across the gasbag.

In the child seat having the chest pad 7A with the structure described above, when the automobile is in a collision and the child moves forward faster than a certain speed, a pressure is applied to the gasbag 22 via the cover shield 23 and the gas pressure inside the gasbag 22 exceeds a certain value. The sections of the gasbag 22 facing the holes 25 are torn so that the gas inside the gasbag 22 flows into the airbag 21 to inflate the airbag 21. As shown in FIG. 10, the airbag 21 is inflated until the tether strap 21t is stretched. In this case, the maximum height of the inflated airbag 21 is regulated by the tether strap 21t.

When the airbag 21 is inflated, the airbag 21 receives the head of the child for absorbing the impact on the head and the neck of the child. The upper portion of the airbag 21 comes under the child's jaw to prevent the neck from leaning forward and to absorb the impact. When the child's body is pressed against the airbag 21, the gas inside the airbag 21 is released through the vent hole 21v so that the airbag 21 can absorb the impact. Furthermore, the gas inside the gasbag 22 is released through the holes 25 so that the impact against the chest or the abdominal region of the child contacting the cover shield 23 is absorbed.

As described above, the chest pad 7A is provided with the tether straps 22t in the gasbag 22. As shown in FIG. 9, when only the lower portion or the upper portion of the cover shield 23 is pressed locally, the tether straps 22t prevent the local bulging of the upper portion or the lower portion of the gasbag 22. Consequently, the pressure in the gasbag 22 reliably increases even when only a part of the gasbag 22 is pressed. When the force exceeds a certain level, the pressure in the gasbag 22 steadily increases to exceed a specific value, thereby tearing the gasbag 22 to introduce the gas into the airbag 21.

Figure 11A:
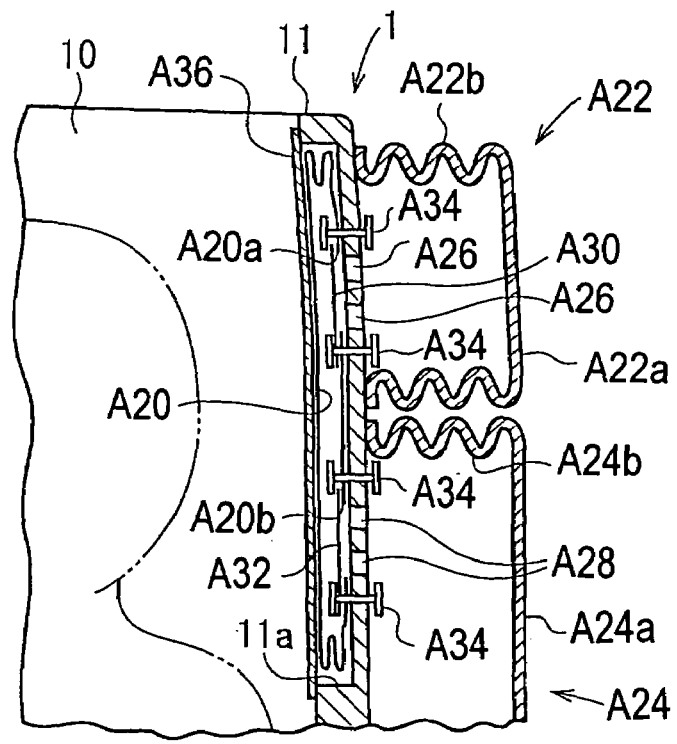
Figure 11B:
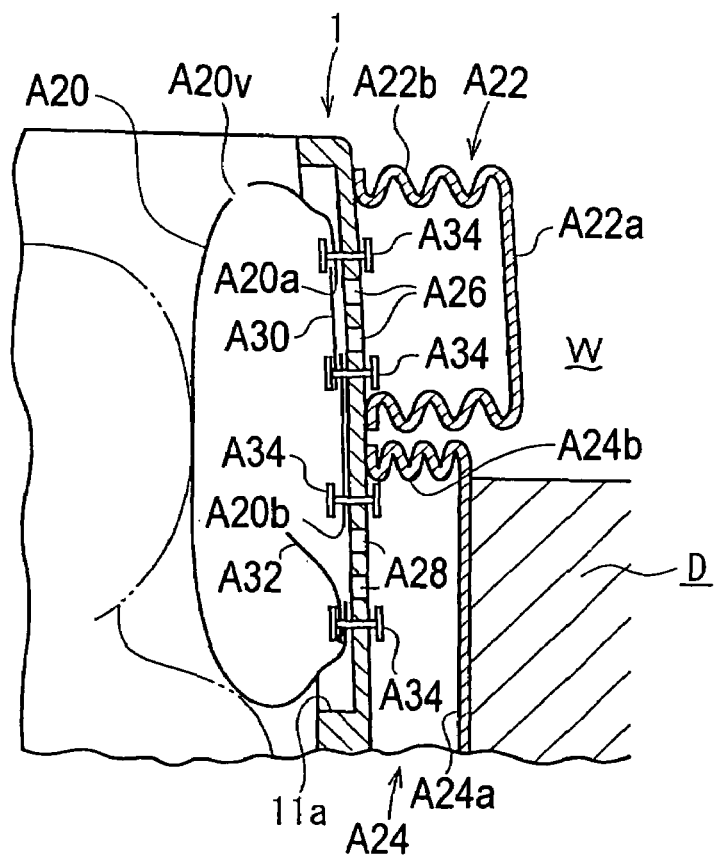

FIGS. 11(a) and 11(b) are sectional views of a child seat according to a still further embodiment of the present invention similar to FIGS. 2(a) and 2(b). FIG. 11(a) shows the child seat before an airbag is inflated, and FIG. 11(b) shows the child seat after the airbag is inflated.

In this embodiment, airbags A20 are provided on upper inner sides of the left and right side guards 11. Each of the side guards 11 has separate upper and lower cushions A22 and A24 at outside thereof. As shown in FIG. 11(b), each airbag A20 has a size to be inflated only at temporal of the child seated in the child seat 1. In this embodiment, each airbag A20 has a vent hole A20v for discharging the gas in the airbag A20 to the exterior. When the child seat 1 is mounted on the car seat, one of the upper cushions A22 faces a window opening W at a side of a vehicle cabin, and one of the lower cushions A24 faces a door trim D.

The cushions A22 and A24 have a hollow body. Each side guard 11 has through holes A26 for communicating the interior of the upper cushion A22 with the interior of the airbag A20 and through holes A28 for communicating the interior of the lower cushion A24 with the interior of the airbag A20. The through holes A26 and A28 have check valves A30 and A32, respectively, for allowing the gas to flow from the respective cushions A22 and A24 into the airbag A20 and preventing the gas from flowing in the opposite direction. The cushions A22 and A24 are filled with air.

The upper cushion A22 includes a load-sustaining surface A22a facing a window glass of a window opening W (not shown), at a side of a vehicle when the child seat 1 is mounted on the seat of the vehicle; a side circumference A22b connecting a periphery of the load-sustaining surface A22a with a side surface of the side guard 11, and a contact-restricting member (not shown) for preventing the load-sustaining surface A22a from approaching the side surface of the side guard 11. In this embodiment, the side circumference A22b is formed in bellows to be able to contract in a direction that the load-sustaining surface A22a comes close to the side surface of the side guard 11.

The lower cushion A24 includes a load-sustaining surface A24a facing a door trim D when the child seat 1 is mounted on the seat of the vehicle; a side circumference A24b connecting a periphery of the load-sustaining surface A24a with the side surface of the side guard 11, and a contact-restricting member (not shown) for preventing the load-sustaining surface A24a from contacting the side surface of the side guard 11. The side circumference A24b is also formed in bellows to be able to contract in a direction that the load-sustaining surface A24*a* comes close to the side surface of the side guard 11.

The load-sustaining surface A22*a* is integrated with the side circumference A22*b* of the upper cushion A22. The load-sustaining surface A24*a* is integrated with the side circumference A24*b* of the lower cushion A24. Accordingly, the load-sustaining surfaces A22*a* and A24*a* of the side circumferences A22*b* and A24*b* are airtightly attached to an entire periphery of the side surface of the side guard 11. The load-sustaining surfaces A22*a* and A24*a* and the side circumferences A22*b* and A24*b* are formed of a semi-rigid synthetic resin and an un-woven fabric covers the surfaces.

The contact-restricting member is disposed between the side guard 11 and the load-sustaining surfaces A22*a* and A24*a*. The contact-restricting member can be plastically deformed when a load exceeding a predetermined level is applied to the load-sustaining surfaces A22*a* and A24*a* in a direction of approaching the side guard 11, thereby allowing the load-sustaining surfaces A22*a* and A24*a* to come close to the side guard 11.

Each of the side guards 11 has a recess portion 11*a* at an upper inner side thereof for housing the airbag A20. The through holes A26 and A28 are provided in the recess portion 11*a* at the side surface of the side guards 11. A plurality of through holes A26 and A28 is formed in small holes arranged adjacent to one another.

The airbag A20 has a gas inlet A20*a* for receiving the gas from the upper cushion A22 through the through hole A26 and a gas inlet A20*b* for receiving the gas from the lower cushion A24 through the through hole A28. The peripheries of the gas inlets A20*a* and A20*b* are overlapped on the side surface of the side guard 11 in the recess portion 11*a* such that the through holes A26 and A28 face the gas inlets A20*a* and A20*b*, respectively, and are airtightly fixed therearound. Reference numerals A34 denote fasteners such as rivets for fixing the peripheries of the gas inlets A20*a* and A20*b* to the side surface of the side guard 11.

As shown in FIG. 11(*a*), check valves A30 and A32 are formed of sheets, and are overlapped on the side surface of the side guard 11 in the recess portion 11*a* for covering the through holes A26 and A28 from the inside of the airbag A20, respectively. Parts of the peripheries of the check valves A30 and A32 are fixed to the side surface of the side guard 11 with the fasteners A34 that fix parts of the peripheries of the gas inlets A20*a* and A20*b* of the airbag A20. The rest of the peripheries are fastened to the side surface of the side guard 11 with the fasteners A34. As shown in FIG. 11(*a*), the check valves A30 and A32 are arranged inside the peripheries of the gas inlets A20*a* and A20*b* (inside the airbag A20), respectively.

When the gas tries to flow into the airbag A20 from the upper cushion A22 through the through holes A26, the check valve A30 separates from the side surface of the side guard 11 by the gas pressure to open the through hole A26, thereby allowing the gas to flow from the upper cushion A22 into the airbag A20. When the gas tries to flow from the airbag A20 through the through holes A26 into the upper cushion A22, the check valve A30 is pressed against the side surface of the side guard 11 due to the gas pressure to close the through holes A26, thereby preventing the gas from flowing from the airbag A20 into the upper cushion A22.

When the gas tries to flow into the airbag A20 from the lower cushion A24 through the through hole A28, the check valve A32 separates from the side surface of the side guard 11 by the gas pressure to open the through hole A28, thereby allowing the gas to flow from the lower cushion A24 into the airbag A20. When the gas tries to flow from the airbag A20 through the through hole A28 into the lower cushion A24, the check valve A32 is pressed against the side surface of the side guard 11 due to the gas pressure to close the through hole A28, thereby preventing the gas from flowing from the airbag A20 into the lower cushion A24.

In this embodiment, the check valves A30 and A32 are made of a rubber sheet, so that the check valves can be deformed relatively flexibly from a flat state to a warped state and can be elastically restored to an original flat state when the warping is released. The check valves A30 and A32 may be formed of an elastic resin sheet, a metal thin plate or a fabric other than the rubber sheet. Each of the airbags A20 is housed in the recess portions 11*a* in a folded state. A cover sheet A36 is provided along an inner side of each of the side guards 11 so as to cover the recess portions 11*a*. When the airbags A20 are inflated, the airbags A20 push the cover sheets A36 to be broken.

In the child seat 1 with such a structure, when the child seat 1 strikes a side of the cabin in a car crash, the load-sustaining surface A24*a* of the lower cushion A24 supports the door trim D and the load-sustaining surface A22*a* of the upper cushion A22 supports the window glass of the window opening W or a colliding article (a B-pillar, a crash vehicle, a telegraph post, a passenger and so on, not shown). When the loads from the door trim D and the window glass or the colliding article exceed a predetermined level, the contact-restricting members of the cushions A22 and A24 are plastically deformed and the load-sustaining surfaces A22*a* and A24*a* retract to come close to the side guard 11, thereby absorbing the impact.

When the load-sustaining surfaces A22*a* and A24*a* approach the side guard 11, the volumes of the cushions A22 and A24 decrease. Accordingly, the gas flows into the airbag A20 through the through holes A26 and A28 from the cushions A22 and A24, respectively. When the gas from the cushions A22 and A24 is introduced into the airbag A20, the airbag A20 breaks the cover sheet A36 and is inflated between the side guard 11 and the head of the child, thereby receiving the head of the child and absorbing the impact to the head.

In this embodiment, the two separate upper and lower cushions A22 and A24 are provided on the outer side surface of the side guard 11, and face the window opening W at the side of the cabin and the door trim D, respectively. Accordingly, as shown in FIG. 11(*b*), when the child seat 1 strikes the side of the cabin while the window glass is open, the window glass does not push the load-sustaining surface A22*a* of the upper cushion A22 and the door trim D pushes the lower cushion A24. As a result, the gas in the lower cushion A24 surely flows into the airbag A20 without escaping to the upper cushion A22, thereby inflating the airbag A20 quickly.

In this embodiment, the through holes A26 and A28 include the check valves A30 and A32, respectively, for allowing the gas to flow from the respective cushions A22 and A24 into the airbag A20 and prevent the gas from flowing in the opposite direction. Accordingly, when the gas flows into the airbag A20 from one of the cushions A22 and A24, the gas does not flow from the airbag A20 to the other of the cushions A22 and A24. Also, the gas does not flow from the airbag A20 into the cushions A22 and A24 when the airbag A20 receives the head of the child, thereby maintaining an inner pressure of the airbag A20 at a high level.

In this embodiment, the airbag A20 has the vent hole A20*v*. Accordingly, when the airbag A20 receives the head of the child, the gas in the airbag A20 flows to the exterior through the vent hole A20v, thereby absorbing the impact applied to the head of the child.

In this embodiment, the interior of the airbag A20 and the interior of the cushions A22 and A24 communicate with each other. Accordingly, when the cushions A22 and A24 receive a load, the cushions A22 and A24 are pushed to supply the gas in the cushions A22 and A24 into the airbag A20, thereby eliminating airbag-inflating means such as an inflator. The airbag A20 is not inflated toward the side of the seat body 2. Accordingly, an unexpected external force is not applied to a person next to the child seat 1. The cushions A22 and A24 absorb an impact when the child seat 1 strikes the person.

Figure 12A:
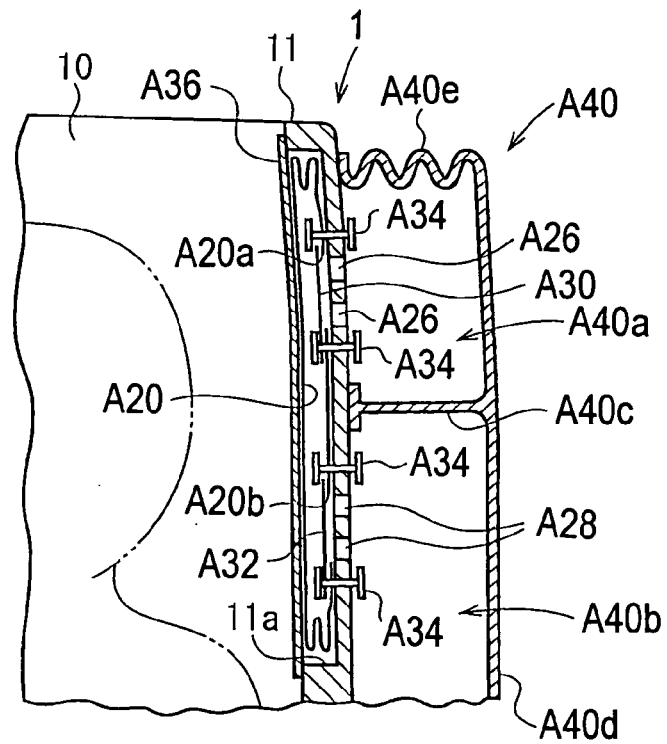
Figure 12B:
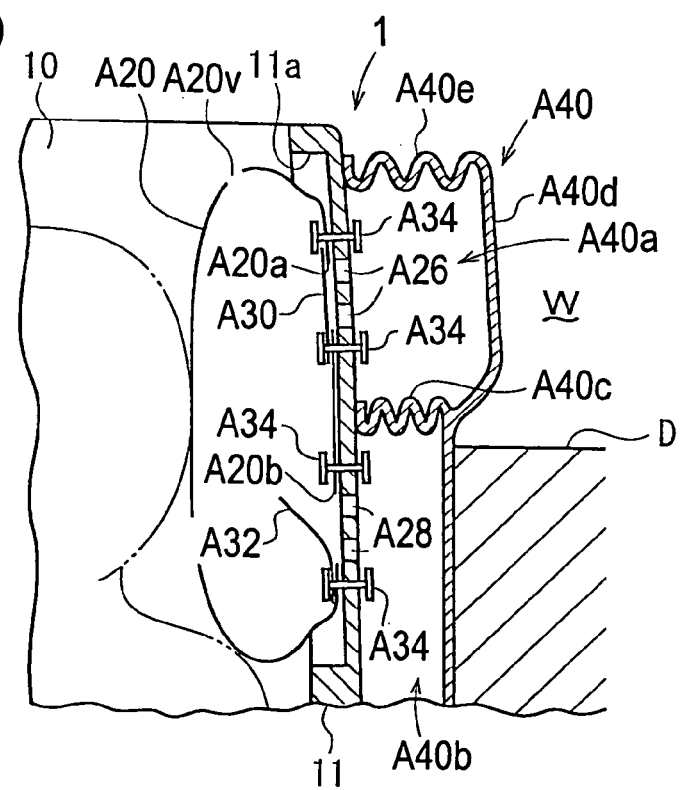

FIGS. 12(a) and 12(b) are sectional views of a child seat according to a still further embodiment of the present invention similar to FIGS. 2(a) and 2(b). FIG. 12(a) shows the child seat before an airbag is inflated, and FIG. 12(b) shows the child seat after the airbag is inflated. The child seat 1 includes the airbag A20 on each of the upper inner side of the left and right side guards 11 and a cushion A40 on each of the outer sides thereof. The cushions A40 extend from the left and right sides of the backrest 10 to the left and right sides of the car seat along the side surface of the side guard 11.

The interior of each cushion A40 is divided into two separate upper and lower hollow spaces A40a and A40b. The upper hollow space A40a occupies a cushion region facing the window opening W at the side of the cabin when the child seat 1 is mounted on the car seat. The lower hollow space A40b occupies a cushion region facing the door trim D. Reference numeral A40c denotes a partition wall that partitions the interior of the cushion A40 into the upper hollow space A40a and the lower hollow space A40b. The partition wall A40c is arranged to extend nearly at the same height as that of a lower rim of the window opening W (or an upper rim of the door trim D) when the child seat 1 is mounted on the car seat. The hollow spaces A40a and A40b are filled with atmospheric-pressure air.

The cushion A40 includes a load-sustaining surface A40d, a side circumference A40e connecting a periphery of the load-sustaining surface A40d to the side surface of the side guard 11, and a contact-restricting member (not shown) for preventing the load-sustaining surface A40d from coming close to the side surface of the side guard 11. The partition wall A40c, the load-sustaining surface A40d, and the side circumference A40e are integrally formed. The side circumference A40e and the partition wall A40c are airtightly attached to the entire periphery of the side surface of the side guard 11 all around the hollow spaces A40a and A40b at peripheries thereof opposite to the load-sustaining surface A40d.

In this embodiment, the side circumference A40e is formed in bellows so as to be contracted in the direction in which the load-sustaining surface A40d comes close to the side of the side guard 11. The contact-restricting member also has a structure similar to that of the contact-restricting members of the cushions A22 and A24 of the foregoing embodiment.

The partition wall A40c, the load-sustaining surface A40d, and the side circumference A40e are formed of a semi-rigid synthetic resin, similar to the load-sustaining surfaces A22a and A24a and the side circumferences A22b and A24b of the cushions A22 and A24 of the above-described embodiment. The surfaces of the load-sustaining surface A40d and the side circumference A40e are covered with an unwoven fabric.

In this embodiment, the side guard 11 has the through holes A26 for communicating the interior of the upper hollow space A40a of the cushion A40 with the airbag A20 and the through holes A28 for communicating the interior of the lower hollow space A40b with the airbag A20. The through holes A26 and A28 have the check valves A30 and A32 for allowing the gas to flow from the respective hollow spaces A40a and A40b into the airbag A20 and prevent the gas from flowing in the opposite direction. The airbag A20 has the vent hole A20v for discharging the gas in the airbag A20 to the exterior.

In this embodiment, when the child seat 1 strikes the side of the cabin in a car crash, the door trim D pushes the lower hollow space A40b of the cushion A40, and the upper hollow space A40a is pushed by the window glass of the window opening W or a colliding article (a B-pillar, a crash vehicle, a telegraph post, a passenger and so on). When the loads from the door trim D and the window glass or the colliding article exceed a predetermined level, the contact-restricting member in the cushion A40 is plastically deformed and the load-sustaining surface A40d comes close to the side guard 11, thereby absorbing the impact.

When the load-sustaining surface A40d closely contacts the side guard 11, the volumes of the upper hollow spaces A40a and A40b decrease, and the gas in the hollow spaces A40a and A40b flows into the airbag A20 through the through holes A26 and A28, respectively. The gas from the hollow spaces A40a and A40b inflate the airbag A20 between the side guard 11 and the head of the child, thereby absorbing the impact to the head.

In this embodiment, the two separate upper and lower hollow spaces A40a and A40b are provided in the cushion regions facing the window opening W at the side of the cabin and the door trim D, respectively. As shown in FIG. 12(b), when the child seat 1 strikes the side of the cabin while the window glass is open, the window glass does not push the upper hollow space A40a and the door trim D pushes the lower hollow space A40b. Accordingly, the gas in the lower hollow space A40b securely flows into the airbag A20 without escaping to the upper hollow space 40a, so that the airbag A20 is inflated quickly.

In this embodiment, the check valves A30 and A32 are provided at the through holes A26 and A28 for allowing the gas to flow from the respective upper hollow spaces A40a and A40b into the airbag A20 and for preventing the gas from flowing in the opposite direction. Accordingly, when the gas flows into the airbag A20 from one of the hollow spaces A40a and A40b, the gas is prevented from flowing from the airbag A20 to the other of the hollow spaces A40a and A40b. When the airbag A20 receives the head of the child, the gas is prevented from flowing from the airbag A20 into the hollow spaces A40a and A40b, thereby maintaining the inner pressure of the airbag A20 at a high level.

In this embodiment, the airbag A20 has the vent hole A20v. Accordingly, when the airbag A20 receives the head of the child, the gas in the airbag A20 flows to the exterior through the vent hole A20v, thereby absorbing the impact applied to the head of the child. The interior of the airbag A20 communicates with the interior of the hollow spaces A40a and A40b. When a load is applied to the hollow spaces A40a and A40b, the gas in the hollow spaces A40a and A40b flows into the airbag A20, thereby eliminating inflating means such as an inflator. The airbag A20 does not inflate toward the side of the child seat 1, so that an unexpected external force is not applied to a person next to the child seat 1. When the child seat 1 strikes the person, the cushion A40 absorbs an impact.

In the embodiments described above, the cushions A22 and A24 and the hollow spaces A40a and A40b of the cushion A40 are filled with atmospheric-pressure air. The cushions A22 and A24 and the hollow spaces A40a and A40b of the cushion A40 may be filled with air having a pressure higher than the atmospheric pressure (for example, about 1.5 to 3 times higher).

Figure 13A:
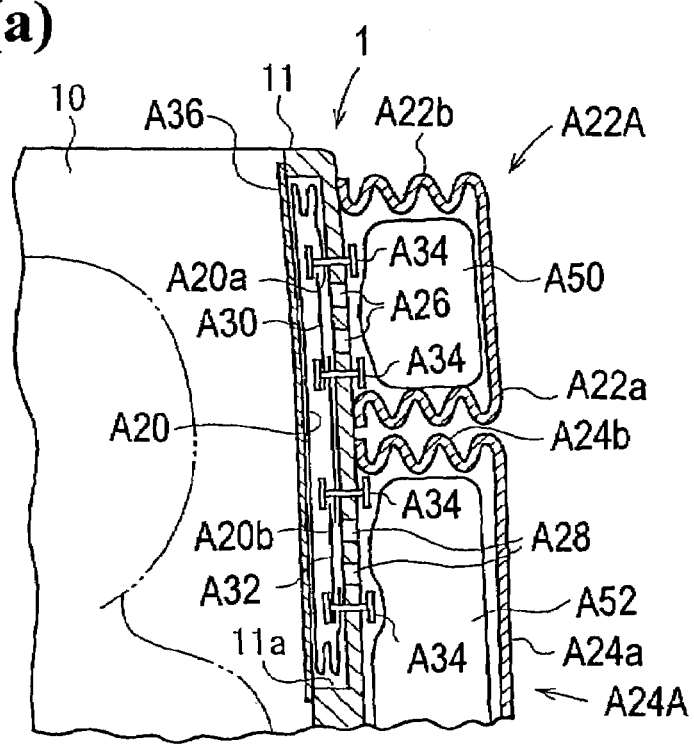
Figure 13B:
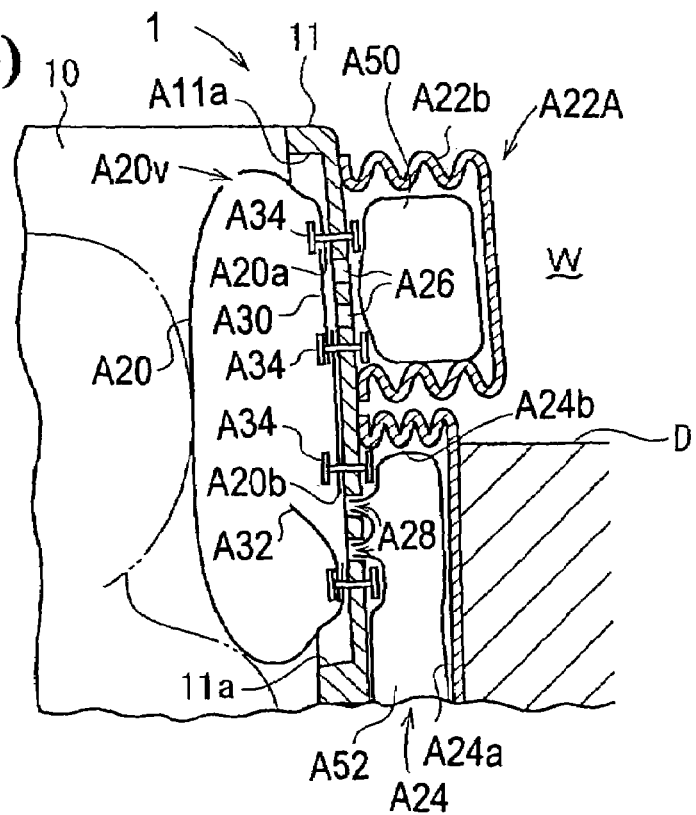

FIGS. 13(a) and 13(b) show a still further embodiment of the invention. A child seat 1 in FIGS. 13(a) and 13(b) also includes the airbag A20 on each of the upper inner sides of the left and right side guards 11 and two separate upper and lower cushions A22A and A24A on each of the outer sides of the side guards 11, like the child seat 1 according to the embodiment of FIG. 1. As shown in FIG. 13(b), the upper cushion A22A is arranged to face the window opening W in the side of the cabin when the child seat 1 is mounted on a car seat and the lower cushion A24A is arranged to face the door trim D.

Also in the child seat 1, the interiors of the cushions A22A and A24A are hollow. Each side guard 11 has a through hole A26 for communicating the interior of the upper cushion A22A with the interior of the airbag A20 and a through hole A28 for communicating the interior of the lower cushion A24A with the interior of the airbag A20. The through holes A26 and A28 have the check valves A30 and A32, respectively, for allowing the gas to flow from the respective cushions A22A and A24A into the airbag A20 and preventing the gas from flowing in the opposite direction.

With this embodiment, the cushions A22A and A24A include gasbags A50 and A52 each containing gas therein, respectively. The gasbags A50 and A52 are each shaped like a bag made of a thin synthetic resin film and are constructed to be broken and to thereby discharge the inner gas when the inner pressure has exceeded a predetermined level. The gasbags A50 and A52 of this embodiment contain air with a pressure higher than atmospheric pressure (for example, about 1.5 to 3 times higher than the atmospheric pressure). Other arrangements of the child seat 1 are the same as those of the child seat 1 of FIG. 1. Numerals in FIGS. 13(a) and 13(b) show the components same as those of FIGS. 1 and 2(a), 2(b).

In the child seat 1 with such an arrangement, when the child seat 1 strikes the side of the cabin in a car crash, the load-sustaining surface A24a of the lower cushion A24A sustains the door trim D and the load-sustaining surface A22a of the upper cushion A22A supports the window glass of the window opening W or colliding articles (a B-pillar, a crash vehicle, a telegraph post, a passenger and so on, not shown). The door trim D and the window glass or the colliding articles apply a high load to the cushions A24A and A22A to push the gasbags A50 and A52, respectively. When the inner pressure in the gasbags A50 and A52 has exceeded a predetermined level, the portions of the gasbags A50 and A52 which face the through holes A26 and A28, respectively, are broken, so that the gas in the gasbags A50 and A52 flows out. The gas from the gasbags A50 and A52 flows into the airbag A20 through the respective through holes A26 and A28 to inflate the airbag A20, so that the airbag A20 absorbs the impact applied to the head of a child.

Since the gas in the gasbags A50 and A52 flows out, the impact applied to the child seat 1 from the door trim D or the window glass or the colliding articles is also absorbed.

Also, in the child seat 1, the airbag A20 is inflated with the gas released from the gasbags A50 and A52, and the gasbags A50 and A52 are broken to thereby release the gas by the pressure of the window glass, the door trim D and so on. Accordingly, there is no need to provide an inflator and its trigger device. Therefore, the child seat 1 has a simple structure and a low weight.

Also with the child seat 1, the two separate upper and lower cushions A22A and A24A which face the window opening W in the side of the cabin and the door trim D, respectively, are provided on the outer side of each side guard 11. Accordingly, for example, as shown in FIG. 13(b), when the child seat 1 strikes the side of the cabin when the window glass is open, the upper cushion A22A is not pushed by the window glass but only the lower cushion A24A is pushed by the door trim D. However, the gas in the lower cushions A24A is surely supplied into the airbag A20 without escaping to the upper cushion A22A, thus inflating the airbag A20 quickly.

Figure 14A:
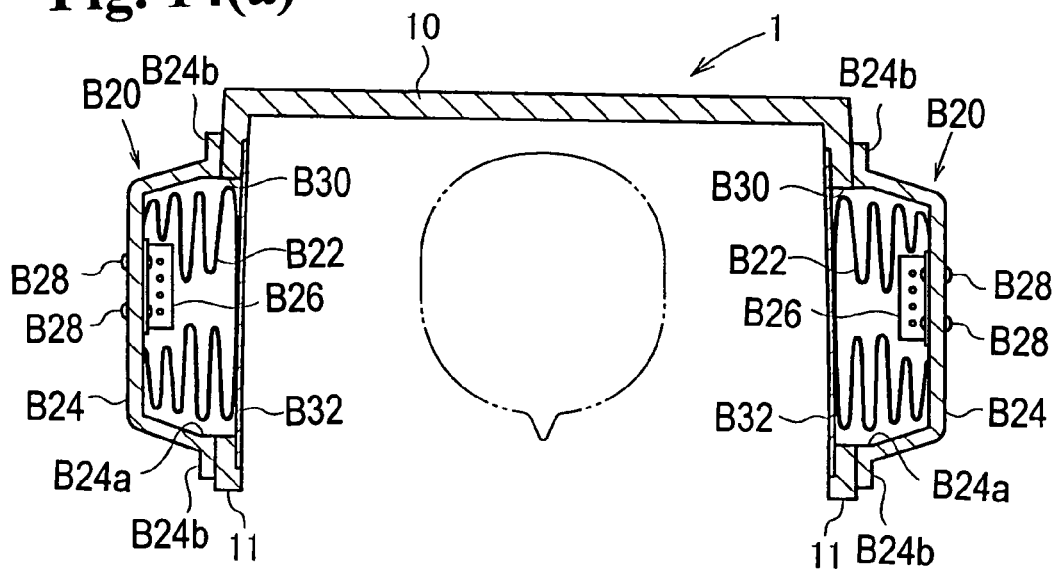
Figure 14B:
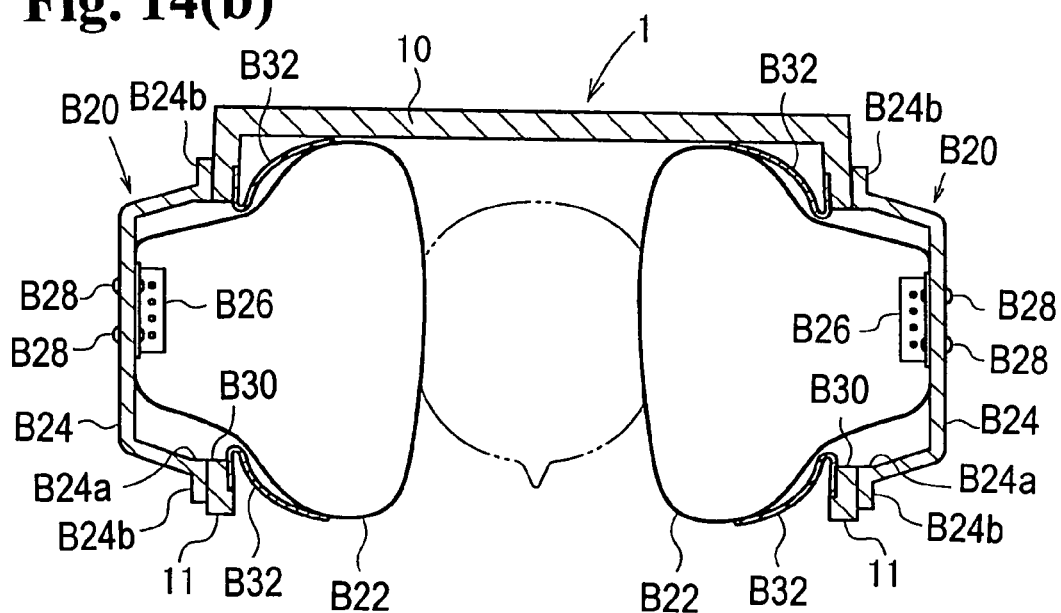

FIGS. 14(a) and 14(b) are sectional views of a child seat according to a still further embodiment of the present invention similar to FIGS. 2(a) and 2(b). FIG. 14(a) shows the child seat before airbags are inflated, and FIG. 14(b) shows the child seat when the airbags are inflated.

In this embodiment, the child seat 1 has airbag devices B20 at the upper portions of the side guards 11 at the left and right sides of the head of the child sitting in the child seat 1. Each of the airbag devices B20 has an airbag B22, a casing B24 for accommodating the airbag B22, an inflator B26 serving as gas supply means for inflating the airbag B22, and a sensor (not shown) for detecting a vehicle collision. The casing B24 has an opening B24a in one lateral surface thereof. The airbag B22 is accommodated inside the casing B24 in a folded state. The inflator B26 generates the gas based on a detection signal of the sensor.

As shown in FIG. 14(b), the airbags B22 have sizes large enough to occupy only the upper areas of the side guards 11, i.e. only near the left and right sides of the head of the child sitting in the child seat 1. Each of the inflators B26 is disposed in the corresponding airbag B22 and is mounted on the other lateral surface of the casing B24. The inflator B26 mounted on the other lateral surface of the corresponding casing B24 is secured with fixtures B28 such as rivets. A base end of each airbag B22 is clamped between a flange of the corresponding inflator B26 and the corresponding casing B24.

Each of the side guards 11 has an airbag inflation opening B30 at the upper portion thereof, such that the opening B30 faces a side of the head of the child sitting in the child seat 1. As shown in FIG. 14(a), the airbag devices B20 are mounted on the outer surfaces of the side guards 11 at the left and right sides, such that the opening B24a of each casing B24 communicates with the corresponding airbag inflation opening B30. The casing B24 has a flange B24b protruding around the perimeter of the opening B24a thereof. The flange B24b of the casing B24 is placed on the perimeter of the corresponding airbag inflation opening B30 and is secured to the corresponding side guard 11.

Each of the side guards 11 has a cover sheet B32 for covering the airbag inflation opening B30 from an inner surface thereof. When the airbag B22 is inflated, the inflating pressure of the airbag B22 breaks the corresponding cover sheet B32 to open the airbag inflation opening B30. When the vehicle collides with something, the sensors of the airbag devices B20 detect the impact and the inflators B26 eject the gas based on the detection signal of the sensors. As shown in FIG. 14(b), the gas from the inflators B26 inflates the left and right airbags B22 to break the cover sheets B32, and the left and right airbags B22 expand between the child's head and the side guards 11. The left and right airbags B22 receive the child's head from the left and right sides, thereby absorbing the impact of the child's head.

According to the child seat 1 described above, the airbags B22 have sizes large enough to expand only near the sides of the child's head. Consequently, the inflators B26 require only a small capacity, thereby making the child seat 1 lightweight. The airbags B22 are folded in a normal state and inflated only in the case of a vehicle collision. Thus, the child seat 1 does not cause discomfort to the child sitting therein.

Figure 15A:
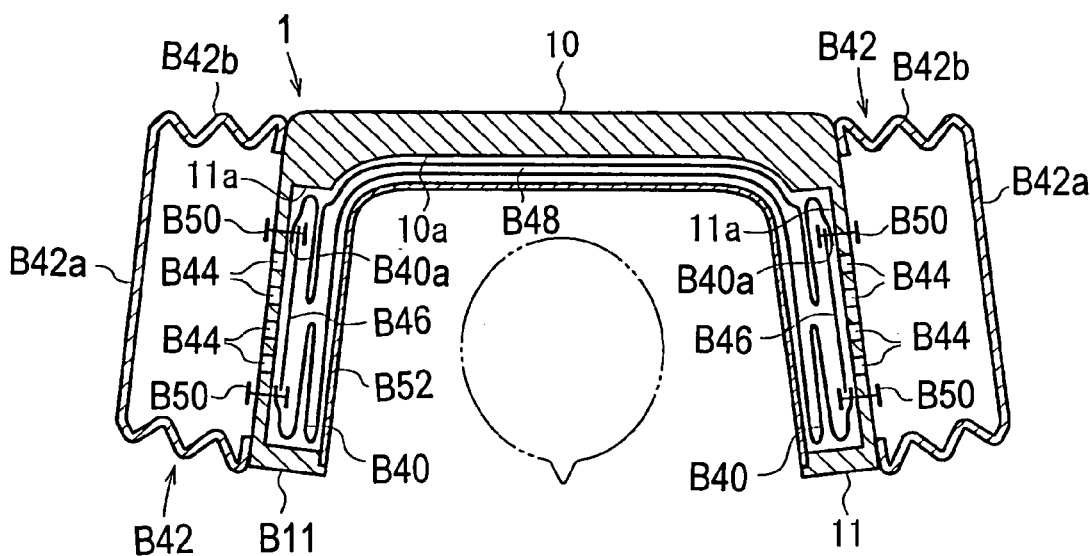

FIGS. 15(*a*) and 15(*b*) are sectional views of a child seat according to a still further embodiment of the present invention similar to FIGS. 2(*a*) and 2(*b*). FIG. 15(*a*) shows the child seat before the airbags are inflated, and FIG. 15(*b*) shows the child seat when the airbags are inflated.

In this embodiment, each of the left and right side guards 11 has an airbag B40 at the upper portion on an inner side surface. The side guard 11 further includes hollow cushions B42 on outer side surfaces. The airbag B40 and the cushion B42 are connected to each other through communicating holes B44 provided at the upper portion of the corresponding side guard 11. The communicating holes B44 are provided with a check valve B46 as non-return means for allowing the gas to flow from the cushion B42 to the airbag B40 and preventing the gas from flowing in the reverse direction. The left and right airbags B40 are connected to each other through a duct (gas passage) B48. The duct B48 is formed along a front surface (surface receiving the back and the head of the child) of the backrest 10 of the child seat body 2.

The airbags B40 have sizes large enough to expand only near the sides of the head of the child sitting in the child seat 1. As shown in FIG. 15 (*a*), each of the side guards 11 has a recessed portion 11*a* for accommodating the folded airbag B40 at the upper portion on the inner side surface thereof. The communicating holes B44 are provided on the surface of each side guard 11 at the recessed portion 11*a*. According to the embodiment, the communicating holes B44*a* are small holes arranged adjacent to each other.

Each of the airbags B40 has a gas inlet B40*a* for introducing the gas from the cushion B42 through the communicating holes B44. The perimeter of the gas inlet B40*a* is placed on the surface of the side guard 11 at the recessed portion 11*a* such that the communicating holes B44 are disposed in the gas inlet B40*a*. The gas inlet B40*a* is sealed airtightly all around the perimeter, and is secured to the surface of the side guard 11 using fittings B50 such as rivets.

In this embodiment, the check valves B46 are formed of sheets. As shown in FIG. 15(*a*), each check valve B46 is laid on the internal surface of the side guard 11 so as to cover the communicating holes B44 adjacent to the airbag B40. The perimeter of each check valve B46 is partially secured using the fittings B50 to the surface of the side guard 11 at the recessed portion 11*a* together with the perimeter of the gas inlet B40*a* of the airbag B40. The other part of the perimeter of the check valve B46 is retained onto the surface of the corresponding side guard 11 with other fittings B50. Each check valve B46 is disposed on the internal surface of the circumferential portion of the corresponding gas inlet B40*a* (internal surface of the airbag B40).

As shown in FIG. 15(*b*), when the gas in the cushion B42 flows into the corresponding airbag B40 through the communicating holes B44, the gas pushes the check valve B46 off the surface of the side guard 11, so that the communicating holes B44 open to allow the gas to flow from the cushion B42 to the airbag B40. When the gas in the airbag B40 tries to flow into the cushion B42 through the communicating holes B44, the gas presses the check valve B46 against the surface of the side guard 11, thereby covering the communicating holes B44. As a result, the gas in the airbag B40 is prevented from flowing into the cushion B42.

In this embodiment, each check valve B46 is formed of a rubber sheet flexible enough to change from a flat shape to a curved shape and resilient enough to restore the flat shape as soon as a force is released. The check valves B46 may be formed of a material other than the rubber, i.e. an elastic resin sheet, thin metal sheet, or cloth.

Each of the cushions B42 has a shape substantially equivalent to that of the surface of the corresponding side guard 11. The cushion B42 includes a load receiving surface B42*a* large enough to cover almost the entire surface of the corresponding side guard 11, lateral peripheral surfaces B42*b* connecting between the perimeter of the corresponding side guard 11 and the load receiving surface B42*a*, and a contact limiter (not shown) for preventing the load receiving surface B42*a* from approaching the side guard 11. The lateral peripheral surfaces B42*b* of each cushion B42 are formed in bellows shrinkable in the direction in which the load receiving surface B42*a* approaches the side guard 11.

In this embodiment, the load receiving surface B42*a* and the lateral peripheral surfaces B42*b* of each cushion B42 are integrated, and the entire perimeters of the lateral peripheral surfaces B42*b* opposite to the load receiving surface B42*a* are secured airtightly to the perimeter of the corresponding side guard 11. The load receiving surface B42*a* and the lateral peripheral surfaces B42*b* of each cushion B42 are formed of a semi-rigid synthetic resin having surfaces covered with non-woven fabric.

The contact limiter is disposed between the side guard 11 and the load receiving surface B42*a* of the corresponding cushion B42, and is plastically deformed when the load receiving surface B42*a* receives a load higher than a predetermined value in the direction of approaching the side guard 11, thereby allowing the load receiving surface B42*a* to approach the side guard 11.

In this embodiment, the duct B48 is formed in a flexible hose. The duct B48 is in a folded flat state or has a small diameter when the gas does not flow. The duct B48 is expanded, i.e. increasing the diameter when the gas flows from the cushion B42. The duct B48 may be a cylindrical member and non-expandable. The left and right ends of the duct B48 are connected to the left and right airbags B40, respectively, so that the left and right airbags B40 communicate with each other.

The backrest 10 has a recessed portion 10*a* for accommodating the duct B48 at a front surface thereof. The recessed portion 10*a* extends horizontally on the front surface of the backrest 10. The left and right ends of the recessed portion 10*a* face the recessed portions 11*a* on the internal surfaces of the left and right side guards 11, respectively.

The left airbag B40 and the right airbag B40 are accommodated in the recessed portions 11*a* in a folded state. The duct B48 is accommodated in the recessed portion 10*a*, and a cover sheet B52 is attached along the internal surfaces of the left and right side guards 11 and the front surface of the backrest 10 so as to cover the recessed portion 10*a* and the recessed portions 11*a*. When the airbags B40 and the duct B48 are inflated, the cover sheet B52 breaks due to the inflating pressure.

As shown in FIG. 15(*b*), when the child seat 1 hits a lateral surface S of the vehicle in case of a side collision, the load receiving surface B42*a* of the corresponding cushion B42 receives the lateral surface S. When the load of the lateral surface S reaches a predetermined value, the contact limiter in the cushion B42 is plastically deformed. Consequently, the load receiving surface B42a retracts while approaching the side guard 11, thereby absorbing the impact.

Figure 15B:
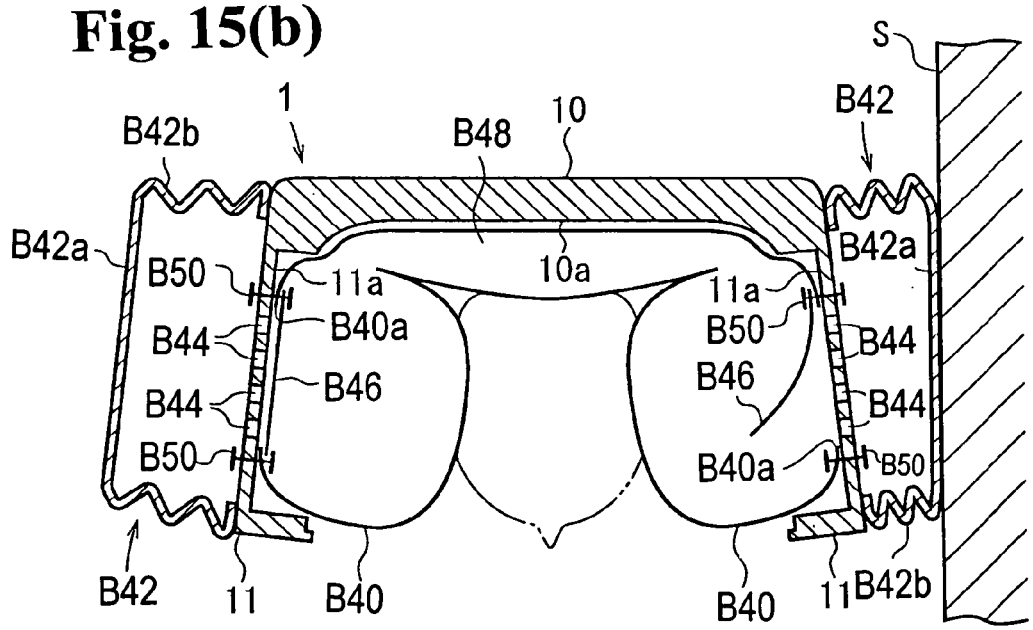

When the load receiving surface B42a retracts as described above, the cushion B42 becomes smaller, and the gas flows from the cushion B42 into one airbag B40 through the communicating holes B44. The gas further flows into the other airbag B40 through the duct B48. As shown in FIG. 15(b), the left and right airbags B40 are inflated between the head of the child and the respective left and right side guards 11 to receive the child's head from the left and right sides, thereby absorbing the impact of the child's head. The duct B48 is inflated at the back of the child's head to receive the back of the child's head, thereby absorbing the impact.

Figure 16A:
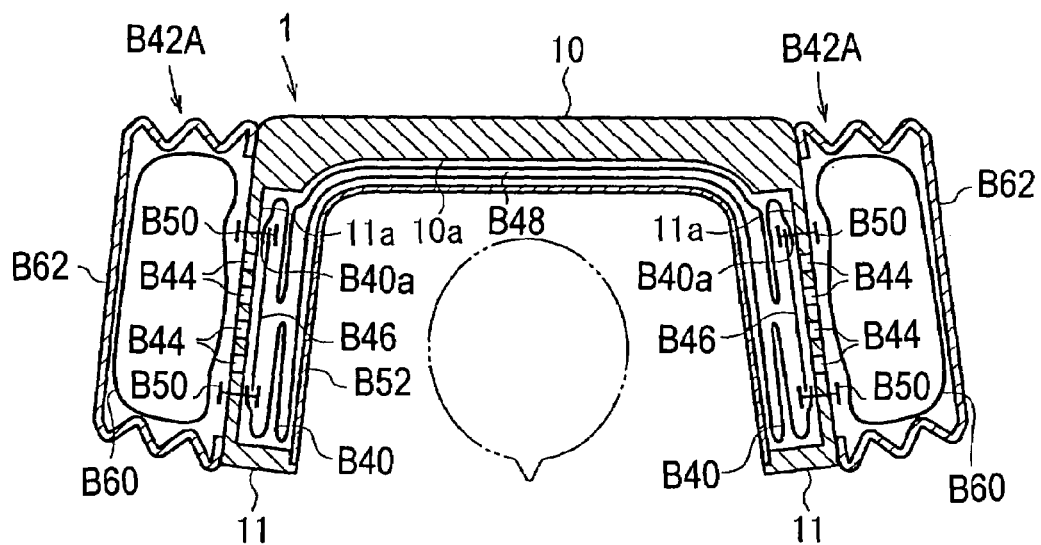
Figure 16B:
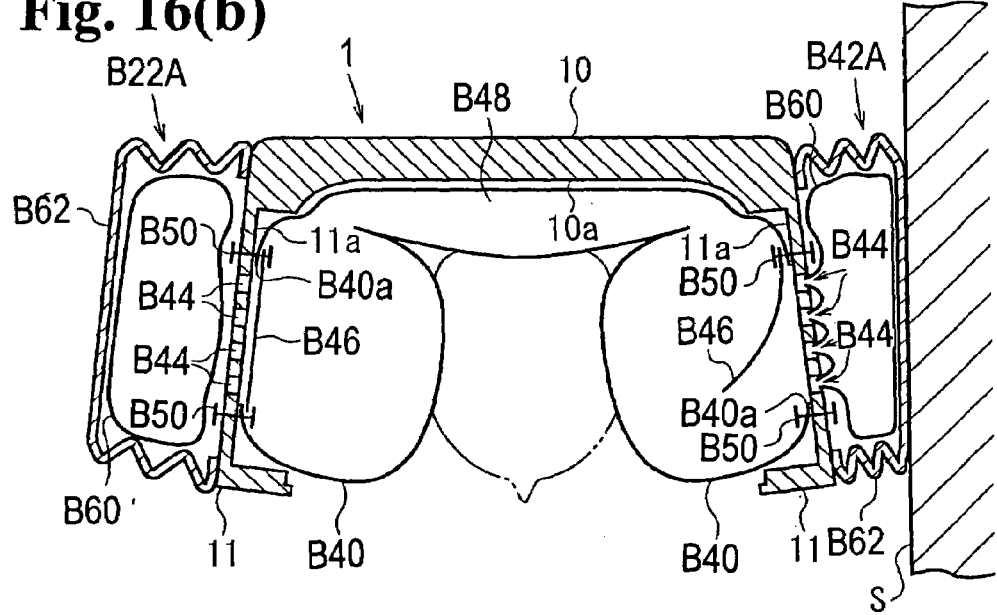

FIGS. 16(a) and 16(b) are sectional views of a child seat according to a still further embodiment of the present invention similar to FIGS. 2(a) and 2(b). FIG. 16(a) shows the child seat before airbags are inflated, and FIG. 16(b) shows the child seat when the airbags are inflated.

In this embodiment, each of the cushions B42A has a gasbag B60 for inflating the airbag B40 and a cover shield B62 for covering the gasbag B60. The gasbag B60 is disposed on the outer side surface of the corresponding side guard 11 so as to cover the communicating holes B44. Each cover shield B62 is formed in a half-shell shape surrounding the outer surface and the lateral peripheral surfaces of the gasbag B60. The entire perimeter of each cover shield B62 is secured airtightly to the side surface of each side guard 11.

The gasbag B60 is formed of a thin resin film and breaks when the internal pressure reaches a predetermined value to allow the internal gas to flow out. The gasbag B60 is filled with the gas at a pressure 1.5 to 3 times higher than the atmospheric pressure. The cover shield B62 is formed of a molded resin having a half-shell shape and a surface covered with non-woven fabric.

As shown in FIG. 16(b), when the child seat 1 hits the lateral surface S in case of a side collision, the corresponding cushion B42 receives a high load from the lateral surface S and the gasbag B60 in the corresponding cushion B42 is compressed. When the internal pressure of the gasbag B60 reaches a predetermined value, the portion of the gasbag B60 facing the communicating holes B44 breaks to allow the gas in the gasbag B60 to flow out. The gas flows into one airbag B40 through the communicating holes B44. The gas further flows into the other airbag B40 through the duct B48. As shown in FIG. 16(b), the left and right airbags B40 are inflated between the head of the child and the respective left and right side guards 11 to receive the child's head from the left and right sides, thereby absorbing the impact of the child's head. The duct B48 is also inflated at the back of the child's head to receive the back of the child's head, thereby absorbing the impact. The gas in the gasbag B60 flows out, thereby absorbing the impact of the lateral surface S to the child seat 1.

Figure 17A:
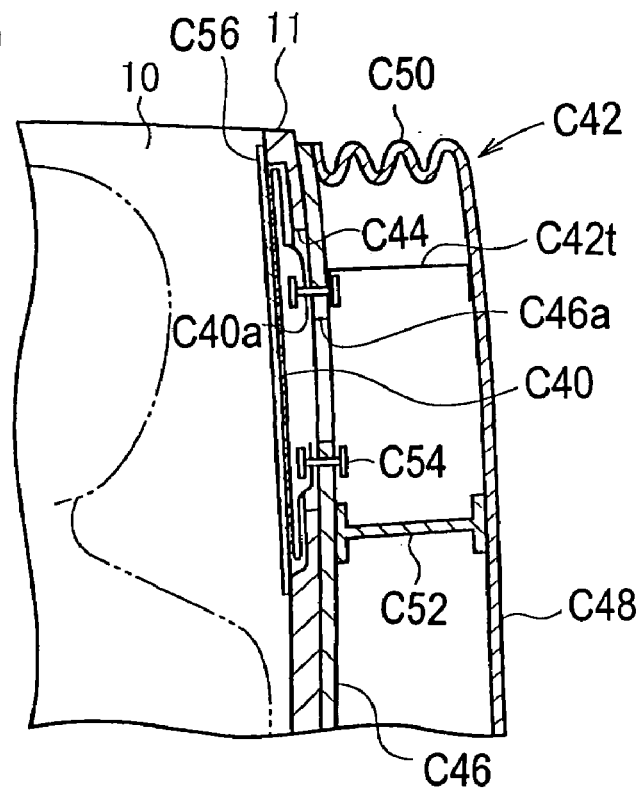
Figure 17B:
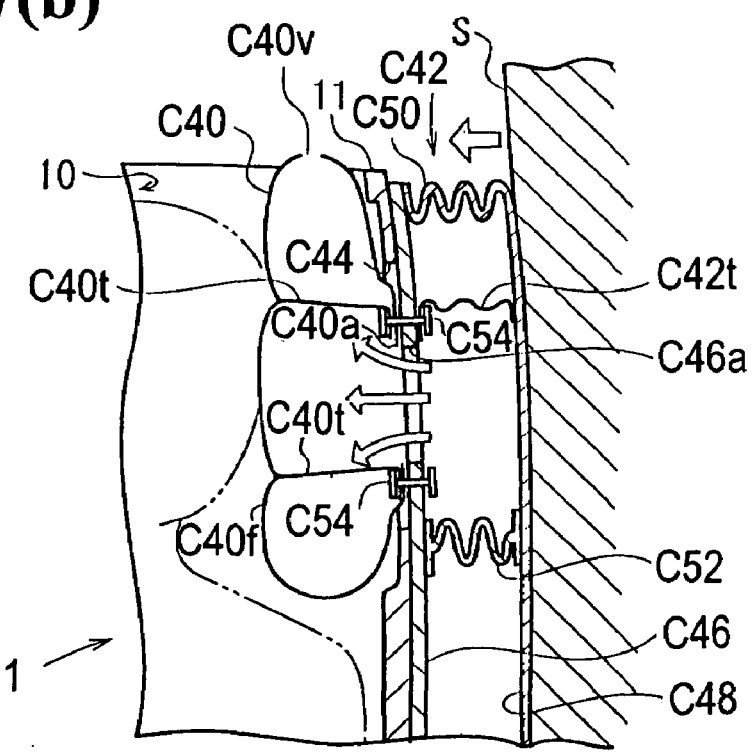

FIGS. 17(a) and 17(b) are sectional views of a child seat according to a still further embodiment of the present invention similar to FIGS. 2(a) and 2(b). FIG. 17(a) shows the child seat before an airbag is inflated, and FIG. 17(b) shows the child seat when the airbag is inflated.

In this embodiment, the child seat 1 has an airbag C40 disposed at the upper portion of the inner side surface of each side guard 11 and a hollow cushion C42 disposed on the outer side surface of each side guard 11. As shown in FIG. 17(a), the airbag C40 communicates with the cushion C42 through an opening C44 provided at the upper portion of each side guard 11. The airbag C40 has a gas inlet C40a for receiving the gas from the cushion C42. The gas inlet C40a provides a constant communication between the interiors of the airbag C40 and cushion C42. As shown in FIG. 17(b), the airbag C40 is inflated to extend only around each side of the head of the child seated in the child seat 1.

The cushion C42 includes a base plate C46 bonded to a surface of the side guard 11, a load-receiving surface C48 located opposite to the base plate C46, a peripheral surface C50 connecting the peripheries of the base plate C46 and the load-receiving surface C48, and a stay C52 for limiting the load-receiving surface C48 to approach the base plate C46. The base plate C46 and the load-receiving surface C48 have a shape substantially similar to the side surface of the side guard 11, and extend around the entire side surface of the side guard 11. The peripheral surface C50 is formed in bellows for allowing contraction in the direction in which the load-receiving surface C48 approaches the base plate C46.

In this embodiment, the load-receiving surface C48 and the peripheral surface C50 are integrated. An entire edge of the peripheral surface C50 opposite to the load-receiving surface C48 is airtightly attached to the periphery of the base plate C46. The load-receiving surface C48 and the peripheral surface C50 are formed of a semi-rigid synthetic resin covered with a non-woven fabric.

The stay C52 is disposed between the base plate C46 and the load-receiving surface C48. When the load-receiving surface C48 receives a force exceeding a predetermined value in the direction of approaching the base plate C46, the stay C52 buckles and allows the load-receiving surface C48 to approach the base plate C46. A gas outlet C46a for releasing the gas in the cushion C42 is provided at an upper portion of the base plate C46. The gas outlet C46a is exposed to the opening C44 in the upper portion of each side guard 11. A periphery of the gas inlet C40a in the airbag C40 is airtightly attached to a periphery of the gas outlet C46a. Reference numeral C54 represents fasteners such as rivets for fastening the gas inlet C40a to the gas outlet C46a. Accordingly, the airbag C40 is attached to the base plate C46 of the cushion C42. The interior of the airbag C40 communicates with that of the cushion C42 through the gas inlet C40a and the gas outlet C46a.

When the cushion C42 is attached to each side guard 11, the base plate C46 is bonded to the outer surface of the side guards 11 while the airbag C40 is passed through the opening C44 from outside each side guard 11. After the airbag C40 is passed through the opening C44 and disposed on each inner side of the side guards 11, the airbag C40 is folded in a flat shape along each inner side of the side guards 11. In this embodiment, as shown in FIG. 17(a), a recess is formed around the inner edge of the opening C44 in each side guard 11. The airbag C40 is folded and disposed in the recess. A cover sheet C56 is provided on each inner side of the side guards 11 for covering the folded airbag C40 and the recess. The cover sheet C56 splits to open by pressure of the airbag C40 when the airbag C40 is inflated.

In this embodiment, the airbag C40 includes airbag tether belts C40t for controlling a shape of the airbag C40 and a vent hole C40v for releasing the gas in the airbag C40 to the outside. The cushion C42 includes a tether belt C42t for preventing the cushion C42 from locally expanding when the cushion C42 is pushed. The tether belts C40t are strings or strips in this embodiment. The tether belts C40t connect a surface C40f facing a side of the head of the child (head-facing surface) when the airbag C40 is inflated and the base of the airbag C40. One end of each of the tether belts C40t is attached to an inner side of the head-facing surface C40f with coupling means such as stitching or welding, while the other end is fastened to the base plate C46 with the fastener C54 together with the edge of the gas inlet C40a in the airbag C40. The vent hole C40v is provided in a part of the airbag C40 facing away from the side guards 11, the backrest 10, and the body of the child when the airbag C40 is inflated (top surface of the airbag C40 in FIG. 17(b)).

One end of the tether belt C42t is attached to the inside of the load-receiving surface C48 with coupling means such as bonding or welding, while the other end is fastened to the base plate C46. As shown in FIG. 17(a), the other end of the tether belt C42t is fastened to the edge of the gas outlet C46a in the base plate C46 of the cushion C42 with the fastener C54. The other end of the cushion tether belt C42t may be fastened to the base plate C46 using a structure other than the fastener C54. The load-receiving surface C48 and the base plate C46 are connected with the tether belts C42t at plural positions in the cushion C42. Accordingly, the cushion C42 is prevented from expanding locally. When a part of the cushion C42 is pushed, the gas does not flow to other part of the cushion C42.

In this embodiment, in addition to the tether belt C42t, the stay C52 connects the load-receiving surface C48 and the base plate C46 in the cushion C42. Thus, the tether belt C42t controls the local expansion of the cushion C42 in combination with the stay C52. The position and number of the tether belt C42t and stay C52 are not limited to the embodiment, and are preferably uniformly distributed over the load-receiving surface C48.

As shown in FIG. 17(b), when the child seat 1 hits an interior side S of a vehicle in a side collision, the load-receiving surface C48 of the cushion C42 receives the interior side S of the vehicle. When the interior side S of the vehicle applies a force over the predetermined value, the stay C52 buckles. Accordingly, the load-receiving surface C48 moves to the base plate C46, thereby absorbing the impact. When the load-receiving surface C48 approaches the base plate C46, the cushion C42 is pushed and the gas flows through the gas outlet C46a and the gas inlet C40a into the airbag C40. When the gas flows from the cushion C42, the airbag C40 is inflated to open the cover sheet C56. The airbag C40 then is inflated between each side guard 11 and the head of the child for receiving each side of the head of the child, thereby absorbing the impact on the head of the child.

In this embodiment, the tether belts C40t connect the base of the airbag C40 and the head-facing surface C40f, so that the head-facing surface C40f of the inflating airbag C40 does not excessively approach the side of the head of the child. Therefore, the airbag C40 is inflated to fit into each space between the sides of the head of the child and the left and right side guards 11. When the airbag C40 is inflated to receive the head of the child, the gas is released from the vent hole C40v to the outside for absorbing the impact on the head of the child.

When the child seat 1 collides with the interior side S of the vehicle in a side collision, a window (not shown) in the interior side S may be open. In this case, only a door trim (not shown) under the window presses the bottom of the cushion C42. In the child seat 1, the tether belts C42t are provided for preventing local expansion of the cushion C42. Accordingly, the gas in the cushion C42 does not flow to other part of the cushion C42, i.e. the upper portion of the cushion C42, so that the cushion C42 can reliably supply the gas to the airbag C40.

Figure 18A:
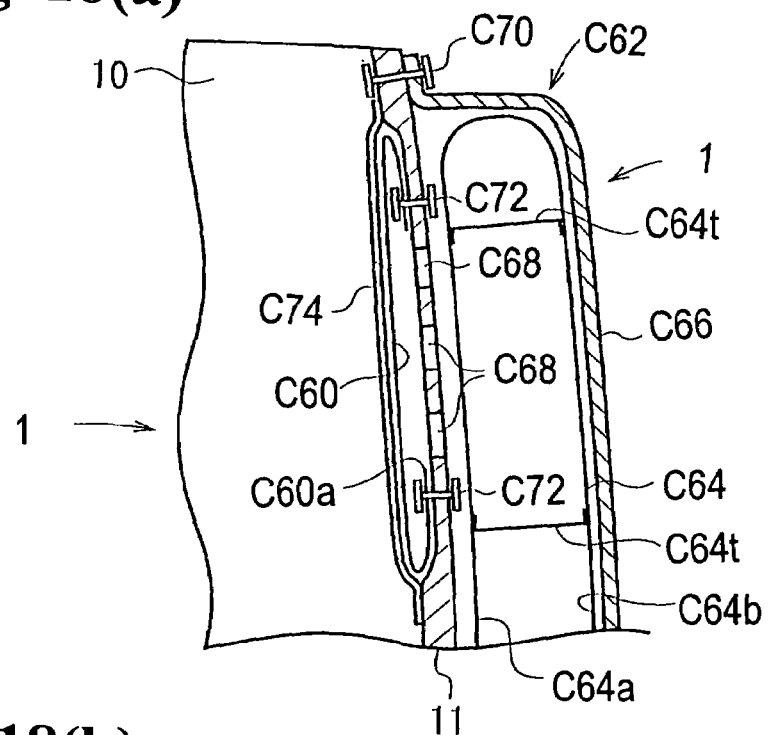
Figure 18B:
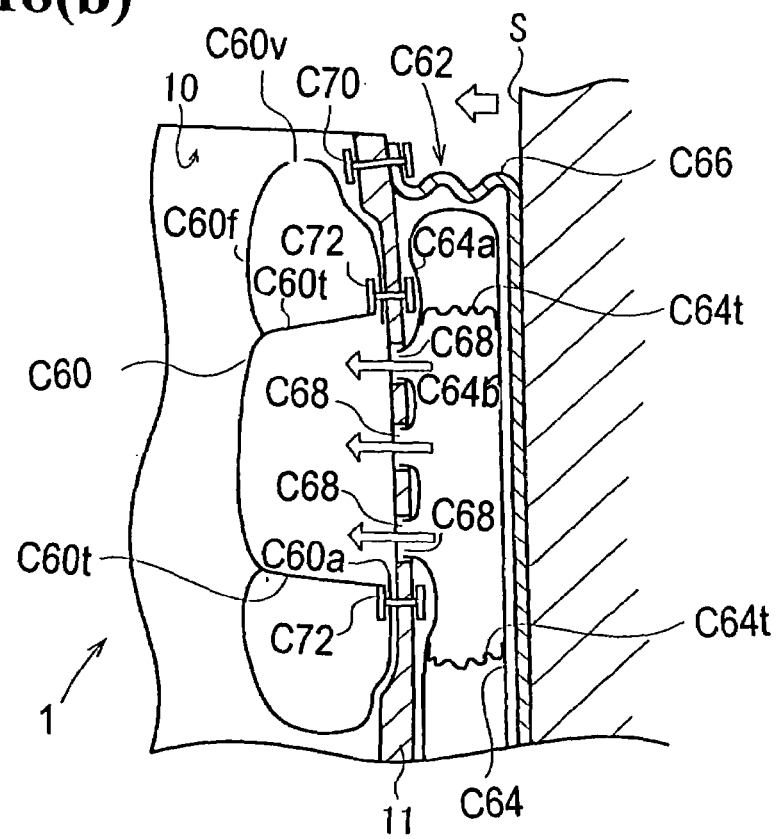

FIGS. 18(a) and 18(b) are sectional view of a child seat according to a still further embodiment similar to FIGS. 2(a) and 2(b). FIG. 18(a) shows the child seat before an airbag is inflated, and FIG. 18(b) shows the child seat when the airbag is inflated.

In this embodiment, a cushion C62 has a gasbag C64 for inflating an airbag C60 and a cover shield C66 for covering the gasbag C64. The gasbag C64 is disposed along each outer surface of the side guards 11. Openings C68 are provided at the upper portion of each side guard 11 and are covered with the gasbag C64. An entire edge of the cover shield C66 is airtightly attached to an outer side of the side guard 11. Reference numeral C70 represents a fastener such as rivet for fastening the cover shield 66 to the side guard 11. The gasbag C64 is made of a synthetic resin thin film and contains air at a pressure higher than the atmospheric pressure (for example, about 1.5 to 3 times higher). The cover shield C66, the load-receiving surface C48 and peripheral surface C50 are formed of a semi-rigid synthetic resin covered with non-woven fabric.

In this embodiment, the airbag C60 includes airbag tether belts C60t for controlling a shape of the airbag C60 and a vent hole C60v for venting the gas. The gasbag C64 in the cushion 62 includes gasbag tether belts C64t for preventing local expansion. Similar to the airbag tether belts C40 in the previous embodiment, the airbag tether belts C60t are strings or strips, and connect a head-facing surface C60f and the base of the airbag C60. One end of each of the tether belts C60t is coupled to an inner surface of the head-facing surface C60f with coupling means such as stitching or welding, while the other end is fastened to the inner surface of the side guard 11 with the fasteners C72 together with the edge of the gas inlet C60a in the airbag C60. A vent hole C60v is provided at an upper portion of the airbag C60.

One end of each of the gasbag tether belts C64t is coupled to the inner surface of the gasbag C64 at the side of each side guard 11 (inner side surface C64a) with coupling means such as bonding or welding, while the other end is fastened to the inner surface of the gasbag C64 facing the interior side S of the vehicle (outer side surface C64b). The inner side surface C64a and the outer side surface C64b are coupled with the tether belts C64t at plural positions in the gasbag C64 for preventing local expansion of the gasbag C64.

As shown in FIG. 18(b), when the child seat 1 hits the interior side S of the vehicle in a side collision, the cushion C62 receives a large force from the interior side S of the vehicle. When a pressure in the gasbag C64 exceeds a predetermined pressure, the gasbag C64 splits to open at positions adjacent to the openings C68, so that the gas in the gasbag C64 flows into the airbag C60. As a result, the airbag C60 is inflated between each side guard 11 and the head of the child for receiving each side of the head of the child, thereby absorbing the impact on the head of the child. At the same time, the gasbag C64 releases the gas to absorb the impact of the interior side S of the vehicle on the child seat 1.

In this embodiment, the tether belts C60t couple the base of the airbag C60 and the head-facing surface C60f for preventing the head-facing surface C60f of the inflating airbag C60 from excessively approaching the head of the child. Therefore, the airbag C60 is inflated to fit into the space between the side of the head of the child and the guard 11. When the airbag C60 receives the side of the head of the child, the gas is released from the vent hole C60v to the outside for absorbing the impact on the side of the head of the child.

When the child seat 1 collides with the interior side S of the vehicle in a side collision, a window (not shown) in the interior side S may be open. In this case, only a door trim (not shown) under the window presses the bottom of the cushion C64. In the child seat 1, the tether belts C64t are provided for preventing local expansion of the cushion C64. Accordingly, the pressure in the gasbag C64 reliably increases to split the gasbag C64.

While the invention has been explained with reference to the specific embodiments of the invention, the explanation is illustrative and the invention is limited only by the appended claims.

What is claimed is:

1. A child seat, comprising:
a seat body having a seat portion, a backrest, and a left side guard and a right side guard,
an airbag provided inside the seat body for receiving a child upon inflation thereof, and
an inflating device communicating with the airbag for inflating the airbag, said inflating device being attached to the seat body at an outside thereof so that when the inflating device is actuated, the airbag is inflated to protect the child,
wherein said inflating device includes a cushion provided on a side surface of the child seat and having a hollow body containing gas therein to provide gas in the hollow body to the airbag.

2. A child seat according to claim 1, wherein said airbag is inflated around a head of a child.

3. A child seat according to claim 1, wherein said airbag is located at an upper part of the child seat for protecting a head of the child when sitting on the child seat, and said inflating device includes a plurality of sections disposed outside the side guards of the child seat.

4. A child seat according to claim 3, wherein at least some of the plurality of sections are arranged vertically at different positions.

5. A child seat according to claim 3, wherein said plurality of sections includes a plurality of separate cushions or one cushion separated into a plurality of hollow spaces.

6. A child seat according to claim 1, wherein said airbag includes left and right airbags disposed on left and right sides of the child seat for protecting a head portion of the child when sitting on the child seat.

7. A child seat according to claim 6, further comprising a gas passage for connecting the left and right airbags so that gas introduced into one of the left and right airbags flows into the other of the left and right airbags through the gas passage, said inflating device having left and right cushions provided on outer surfaces of the left and right side guards, each cushion having an inner space to contain gas therein so that when the cushion is pressed, the gas in the cushion is supplied to the left and right airbags to inflate the same.

8. A child seat according to claim 7, further comprising a reverse-flow prevention device for allowing the gas to flow from the left and right cushions to the left and right airbags and preventing the gas from flowing in an opposite direction.

9. A child seat according to claim 7, wherein at least a part of said gas passage is formed of a hose to be inflated when the gas passes therethrough.

10. A child seat according to claim 7, wherein said left and right cushions are filled with the gas at a pressure higher than atmospheric pressure.

11. A child seat comprising:
a seat body having a seat portion, a backrest, and a left side guard and a right side guard,
an airbag provided adjacent to the seat body for receiving a child upon inflation thereof,
an inflating device communicating with the airbag for inflating the airbag so that when the inflating device is actuated, the airbag is inflated to protect the child, and
a reverse-flow prevention device provided at a communicating portion between the airbag and the inflating device for allowing gas to flow from the inflating device to the airbag and for preventing the gas to flow in an opposite direction.

12. A child seat according to claim 11, wherein said inflating device includes a gasbag filled with the gas.

13. A child seat according to claim 12, wherein said gasbag is filled with the gas at a pressure higher than atmospheric pressure.

14. A child seat according to claim 12, wherein said gasbag includes a gas outlet device for allowing the gas in the gasbag to flow out when a pressure in the gasbag exceeds a predetermined value.

15. A child seat according to claim 14, wherein said gas outlet device includes a film for partitioning the gasbag and the airbag, said film breaking to open when the pressure in the gasbag exceeds a predetermined value.

16. A child seat comprising:
a seat body having a seat portion, a backrest, and a left side guard and a right side guard,
an airbag provided adjacent to the seat body for receiving a child upon inflation thereof,
an inflating device communicating with the airbag for inflating the airbag so that when the inflating device is actuated, the airbag is inflated to protect the child, and
a load-bearing member adapted to be disposed in front of a child when in the child seat, said airbag and inflating device being provided in the load-bearing member,
wherein said inflating device includes a hollow cushion disposed on a rear surface of the load-bearing member.

17. A child seat according to claim 16, further comprising a local-bulging preventing device disposed in the cushion for preventing local bulging of the cushion.

18. A child seat according to claim 16, further comprising a shape regulating device disposed in the airbag for regulating a shape of the airbag when the airbag is inflated.

19. A child seat according to claim 16, wherein said load-bearing member is a chest pad or an impact shield.

20. A child seat according to claim 19, wherein said airbag is deployed upwardly from the load-bearing member along a chest portion of the child for receiving a head portion of the child.

21. A child seat according to claim 19, wherein said inflating device includes a gasbag filled with the gas and disposed on a rear surface of the load-bearing member, said gasbag having a gas outlet device for allowing the gas in the gasbag to flow out when a pressure in the gasbag exceeds a predetermined value.

22. A child seat according to claim 21, wherein said gas outlet device includes a film for partitioning the gasbag and the airbag, said film breaking to open when the pressure in the gasbag exceeds a predetermined value.

23. A child seat according to claim 21, wherein said gasbag is filled with the gas at a pressure higher than atmospheric pressure.

24. A child seat according to claim 21, further comprising a local-bulging preventing device disposed in the gasbag for preventing local bulging of the gasbag.

25. A child seat comprising:
a seat body having a seat portion, a backrest, and a left side guard and a right side guard,
an airbag provided adjacent to the seat body for receiving a child upon inflation thereof, said airbag including left and right airbags disposed on left and right sides of the child seat for protecting a head portion of the child when sitting on the child seat, an inflating device communicating with the airbag for inflating the airbag so that when the inflating device is actuated, the airbag is inflated to protect the child, and a sensor for detecting a collision or roll over of a vehicle, said inflating device being activated to inflate the left and right airbags based on a detection signal of the sensor.

26. A child seat comprising:

a seat body having a seat portion, a backrest, and a left side guard and a right side guard, an airbag provided adjacent to the seat body for receiving a child upon inflation thereof, and an inflating device communicating with the airbag for inflating the airbag so that when the inflating device is actuated, the airbag is inflated to protect the child, wherein said inflating device includes a cushion disposed on an outer side surface of at least one of the side guards, said cushion having therein a local-inflation-preventing device for preventing the cushion from locally expanding.

27. A child seat according to claim 26, wherein said local-inflation-preventing device includes a tether belt or a stay.

28. A child seat according to claim 26, wherein said cushion includes a gasbag, said gasbag being filled with gas at a pressure higher than atmospheric pressure.

29. A child seat comprising:

a seat body having a seat portion, a backrest, and a left side guard and a right side guard, an airbag provided adjacent to the seat body for receiving a child upon inflation thereof, and an inflating device communicating with the airbag for inflating the airbag so that when the inflating device is actuated, the airbag is inflated to protect the child, wherein said airbag includes a shape regulating device therein for regulating a shape of the airbag when the airbag is inflated.

* * * * *